(12) United States Patent
Fagan

(10) Patent No.: US 8,987,636 B2
(45) Date of Patent: Mar. 24, 2015

(54) METHOD AND SYSTEM FOR MULTI PASS WELD PREPARATION USING A CUTTING TORCH

(76) Inventor: Matthew Fagan, Middle Park (AU)

( * ) Notice: Subject to any disclaimer, the term of this patent is extended or adjusted under 35 U.S.C. 154(b) by 1589 days.

(21) Appl. No.: 11/967,445

(22) Filed: Dec. 31, 2007

(65) Prior Publication Data

US 2008/0185368 A1 Aug. 7, 2008

Related U.S. Application Data

(60) Provisional application No. 60/882,719, filed on Dec. 29, 2006.

(51) Int. Cl.
| | | |
|---|---|---|
| *B23K 9/12* | (2006.01) | |
| *B23K 31/02* | (2006.01) | |
| *B23K 7/00* | (2006.01) | |
| *B23K 9/02* | (2006.01) | |
| *B23K 26/38* | (2014.01) | |
| *B26D 5/00* | (2006.01) | |
| *G05B 19/4097* | (2006.01) | |
| *B26F 1/38* | (2006.01) | |
| *B26F 3/00* | (2006.01) | |

(52) U.S. Cl.
CPC .......... *B23K 31/02* (2013.01); *B23K 7/001* (2013.01); *B23K 9/02* (2013.01); *B23K 26/38* (2013.01); *B26D 5/005* (2013.01); *G05B 19/4097* (2013.01); *B26F 1/3813* (2013.01); *B26F 3/00* (2013.01); *G05B 2219/36266* (2013.01); *G05B 2219/49392* (2013.01)
USPC ............. 219/124.33; 219/124.21; 219/124.22

(58) Field of Classification Search
USPC ............. 219/124.33, 124.34, 124.41, 124.21, 219/125.1, 137.7
See application file for complete search history.

(56) References Cited

U.S. PATENT DOCUMENTS

| | | | | |
|---|---|---|---|---|
| 4,469,930 | A * | 9/1984 | Takahashi | 219/121.72 |
| 5,286,006 | A * | 2/1994 | Ogura | 266/77 |
| 5,597,498 | A * | 1/1997 | Sunayama et al. | 219/124.34 |
| 5,815,400 | A * | 9/1998 | Hirai et al. | 700/173 |
| 6,185,476 | B1 * | 2/2001 | Sakai | 700/182 |
| 6,219,586 | B1 * | 4/2001 | Sakai | 700/182 |
| 2002/0107825 | A1 | 8/2002 | Manicke et al. | |

FOREIGN PATENT DOCUMENTS

| | | |
|---|---|---|
| JP | 1157999 A | 3/1999 |
| JP | 2004344917 A | 12/2004 |

OTHER PUBLICATIONS

File History from related European Patent Application 07025249.9 dated Dec. 31, 2007 through Mar. 25, 2011, 273 pages.
American Welding Society: "Arc and Oxygen Cutting" Welding Processes—Arc & Gas Welding & Cutting, Brazing & Soldering, vol. 2, 1978, pp. 460-498.
Communication Pursuant to Article 94(3) EPC in European Patent Application 07025249.9 dated Aug. 5, 2011, 5 pages.
Response to Communication Pursuant to Article 94(3) EPC in European Patent Application 07025249.9 dated Feb. 1, 2012, 24 pages.
Communication Pursuant to Article 94(3) EPC in European Patent Application 07025249.9 dated Jul. 3, 2012, 5 pages.
Response to Communication Pursuant to Article 94(3) EPC in European Patent Application 07025249.9 dated Nov. 13, 2012, 17 pages.

\* cited by examiner

*Primary Examiner* — Henry Yuen
*Assistant Examiner* — Ayub Maye
(74) *Attorney, Agent, or Firm* — Lathrop & Gage LLP

(57) ABSTRACT

Systems, methods and software products generate multi-pass contours for controlling a numerical control (NC) machine to cut out a part with weld preparation. Weld preparation information is combined with an electronic description of the part to form an enhanced electronic file. Multi-pass contours, usable to control an NC machine to cut out the part with at least one bevel, are generated based upon the enhanced electronic file.

15 Claims, 21 Drawing Sheets

METHOD AND SYSTEM FOR MULTI PASS WELD PREPARATION USING A CUTTING TORCH

RELATED APPLICATIONS

The present application claims benefit of priority to U.S. Provisional Patent Application No. 60/882,719, filed Dec. 29, 2006 and titled "Method And System For Multi Pass Weld Preparation Using A Single Cutting Torch", which is incorporated herein by reference.

BACKGROUND

The cutting of steel with torches has been available since the early 20$^{th}$ century. Typically these were oxy-acetylene torches and could cut steel up to twelve inches and more. Torches were hand held. During the 1960's, the torches were held by a machine which followed XY instructions in a simple geometric command language. This is known as "Numerical Control" or "NC", and a NC machine moved the torch to cut simple shapes. This cutting is known as flame cutting or burning, and a representation of a typical modern single torch mechanical arrangement 10, including a single torch 12 and a NC Control 14, is shown in FIG. 1. In the 1970's, plasma arc cutting was introduced, which used ionized gas carrying an electric arc to melt the metal at very high temperatures. This was faster than oxy cutting at thicknesses up to one inch, and common piecing times were greatly reduced. Cutting technologies now include water jet and laser.

For steel cutting applications, it has been a desire of the marketplace to use the torches to cut the steel at an angle to the vertical and thus prepare plate edges for the next process in assembly, that of welding. This edge preparation is also known as beveling. As cut plate is often welded, a machine preparing weld ready components would save time in the manufacturing process. This beveling could eliminate a whole step of manual or semi manual edge preparation using grinders or small machines to result in saved time. Various beveling solutions have been developed over the years.

One solution is a triple head oxy acetylene torch 20 having three torches in an arrangement such as that shown in FIG. 2. With three torches 22 cutting a plate 24 simultaneously, a triple cut beveled edge is created in a single pass. Torches 22 are separated from plate 24, and it is important to note that while in principle these oxy heads can rotate endlessly, the gas supply hoses would wrap around the spinning head and practically limit the torches to one and one-half rotations in either direction. The spinning of the torches is required because of the use of three torches in plane. Use of a single torch does not require the spinning, and recent single torch holding devices do not spin. Not spinning has advantages and is generally desired. The triple torch solution is difficult to program, the center torch is always vertical (i.e., in line with a vertical tilt axis 26), and the overall solution has been very expensive.

To date, none of the beveling solutions have been fully satisfactory for a number of reasons. They have been generally too complex to operate, required drawings prepared in a special way, and/or took hours of manual programming to develop a bevel program, for example. A subtle problem was that the bevel information was separate from the part drawing and there was no simple way to communicate the required information regarding the weld preparation from the person who was qualified and authorized to supply the information to the NC programmer. "Weld preparation" refers to the preparation of an edge of a material for welding. For material over ¼", weld preparation is typically necessary. Preparation usually involves a narrow area for hand welding, which is the weld root, and to allow access, grooves are often cut above and below the root gap.

Multi pass solutions using single torches have been attempted but were too complex to be practical. Machine developers have attempted to put the weld preparation parameters into the NC control language to make it easier to hand program for a single pass (or a double pass in some restricted cases), but multi pass bevels were still very difficult to program quickly or with any certainty. The production of multi pass parts has generally been impractical.

In 1991, the inventor of the advancement disclosed hereinbelow developed an earlier advancement that automatically added a single bevel angle to the industry standard DXF geometry files in common use. More particularly, layers were added to these DXF files to indicate a single 'knife' bevel and the angle of the bevel. While an automatic single pass system was an achievement, the DXF format is limiting because the only way to attach information to the movements was to use the layers described above. This worked, however, as practical assembly welding required only specific angles to be used. The layers were used to communicate many processes, but the welding information was limited to: CUT; CUT45; CUT-45; CUT40; CUT-40; CUT35; CUT-35; CUT30; CUT-30; CUT20; CUT-20; and CUTTRANSITION, where CUT indicated the process type and the numeric part communicated the desired torch tilt. CUTTRANSITION was a special way of communicating a change area where various parameters could be changed such as torch tilt, torch rotation, kerf, and/or feedrate. Typically these areas would still have to be prepared manually with a grinder, as it was impossible to get into internal corners, for example. "DXF" refers to Drawing eXchange Format from AutoDESK, which has become the international defacto standard for two-dimensional shape transmission.

These layers were added by the drawing office, which effectively determined the subsequent assembly welding. These welds were described colloquially as either a knife bevel or a V bevel. The drawings also had to be created in such a way that the largest perimeter of the part was drawn. It could then be assumed that a positive torch tilt was cutting the top of the plate and a negative torch tilt was the line on the bottom of the plate. The torch path would then have to be offset by "plate thickness"*tan($\phi$) where $\phi$ is the torch tilt from vertical. This offset was handled by the NC control which interpreted the NC geometric instructions.

This prior art system saved time in manual preparation of parts for welding and has been in operation for around ten years. However, a knife bevel is far from satisfactory in many cases because the cost and time to weld such a surface is approximately double that associated with an "X" or double bevel. The ideal weld preparation for production (especially of very hard materials such as stainless steel) is a K bevel 30 as shown in FIG. 3, which is a triple pass bevel that eliminates the need for any grinding. K bevel 30 includes an undercut 31, a center cut 32, and a top cut 33 based on the plan dimension 34.

There have been many attempts to produce other beveling systems, most notably by the multi national companies ESAB and Messer Cutting & Welding. These systems can be made to work for a specific job, given enough time, but are overly complicated.

Most manufacturers (including ESAB, Messer, Farley, and Kinetics) have taken the approach of trying to put more intelligence in the NC control and adjusting the offset, kerf and feedrate with bevel tilt. ESAB has in fact put a nearly full weld profile definition (as shown in FIG. 4) in their NC language inside the NC control, albeit missing the critical root gap dimension. For this ESAB NC control: a) the drawings must be created using the maximum enclosing boundary (i.e., the "Max Top Bottom" view 55 shown in FIG. 5); and b) the torch is automatically offset by T*tan(φ) when a top bevel was used. Further, both feedrate and kerf are changed automatically inside the control with varying tilt angle A. Maximum enclosing boundary is also shown in FIG. 14, which depicts the six common dimension methods for a simple three-dimensional rectangle 1400: (a) maximum dimension 1402; (b) top dimension 1404; (c) dimension 1406 at mid thickness; (d) bottom dimension 1408; (e) minimum dimension 1410; and (f) dimension 1412 at specific depth 1414.

All known prior art beveling machines attempt to look after corners automatically, assuming a single pass bevel. All have an inbuilt orthogonal following mode where the rotation plane of the torch is automatically maintained at ninety degrees to the direction of travel of the torch. This is aimed at simpler manual or semi manual programming, not full automation with exact corner profiles for intersecting surfaces.

Existing systems from major manufacturers of steel cutting equipment by plasma or oxy acetylene appear to respectively utilize two types of beveling heads. The first is the triple head oxy machine which is used primarily for triple bevels (albeit with a fixed vertical dihedral). The second is the typically single pass plasma machine with a tilting and swiveling torch, which is generally termed a 'chamfering' unit by ESAB, which means that it is intended for a single pass bevel only. The ESAB programming example 60 shown in FIG. 6 indicates all the core aspects of chamfering a basic shape including the shape, ramps in and out of the movements, and the triangular corner, labeled as S1 through S9. The use of this chamfering unit to produce a multi pass weld preparation is known in the art, but as far as can be determined, this is largely a computer assisted manual process that starts with the original part program and requires additional information in another form on the edge preparation.

Another prior art programming example 70 from ESAB (now promoted as ESAB Expert Motion Plasma VBA with single path programming method) is shown in FIG. 7. Programming example 70 indicates the programming of a double pass bevel with aspects labeled S1' through S14'; offset paths S3' and S5' create a double pass bevel section. Example 70 illustrates the use of the newly added weld profile inside the NC control, clearly intended to aid manual or automatic programming. What this means is that the addition of edge preparation information in prior art beveling systems is at the point of construction of the NC code (i.e., stage 803 in FIG. 8*a*). As such, this is done in a highly machine specific way and at best produces a library of NC parts which can be fabricated on a specific brand of machine and in fact a specific model within that brand range. These machines have changed over the last twenty-five years in their method of programming in the search for a simple way to create edge prepared parts using more intelligent NC controls and better programming systems.

In the processing of plates, the ability to place multiple parts on the one plate to be cut in the one operation is known as nesting. This adds a major layer of complexity to multipass beveling. In documentation readily available from Messer, a large German manufacturer with a long history of involvement in beveling and edge preparation, there is every indication that once NC programs are produced, the NC control has special commands for transformation of axes, including rotary axes which are aimed at allowing the nesting of raw NC part programs which include beveling detail. Their commands are recent extensions to their use of standard format EIA Word Address language generally used with the extensions of A and C. #MCS, #TRAF, #KIN and #CAX TRAX are commands which affect the coordinate systems and the associated bevel tilt, rotation, and orthogonal following.

Without specific detail, this indicates that rather than attempting to build the weld profile into the NC language as ESAB has done, Messer is trying to nest raw NC weld preparation programs directly into the NC control, which may result in problems in adjusting internal rotations and coordinates. In reference to FIG. 8*a*, Messer communicates NC programs to the nesting system, which means storage of parts is in a machine specific form. It also means they may not have the ability to avoid collisions in nesting. These approaches of nesting of NC code as in the Messer approach and placing weld profiles in the NC language as in the ESAB approach distinguish these approaches totally from the invention disclosed herein.

SUMMARY

In an embodiment, a method generates multi-pass contours for controlling a numerical control (NC) machine to cut out a part with weld preparation. Weld preparation information is combined with an electronic description of the part to form an enhanced electronic file. Multi-pass contours, usable to control an NC machine to cut out the part with at least one bevel, are generated based upon the enhanced electronic file.

In an embodiment, a system generates multi-pass contours usable to control a numerical control (NC) machine to cut one or more parts from a sheet of material, where at least one of the parts includes one or more bevels that facilitate welding thereto. The system includes a geometry editor for combining weld preparation information with an electronic description of the part to form an enhanced electronic file. An NC programmer generates multi-pass contours from the enhanced electronic file, where the multi-pass contours are usable to control a cutting tool of the NC machine to cut the part, with the bevels, from the sheet of material.

In an embodiment, a software product has instructions, stored on computer-readable media, wherein the instructions, when executed by a computer, perform steps for generating multi-pass contours for controlling a numerical control (NC) machine to cut out a part with weld preparation, including: instructions for combining weld preparation information with an electronic description of the part to form an enhanced electronic file, and instructions for generating multi-pass contours usable to control an NC machine to cut out the part with at least one bevel based upon the enhanced electronic file.

In an embodiment, an NC machine is provided having at least one processor and a cutting torch. The processor moves the cutting torch under control of software instructions that define multi-pass contours usable to control an NC machine to cut out one or more parts, with bevels, from a sheet of material.

In an embodiment, a system generates multi-pass contours for controlling a numerical control (NC) machine to cut out a part with weld preparation, including: means for combining weld preparation information with an electronic description of the part to form an enhanced electronic file; and means for generating multi-pass contours usable to control an NC machine to cut out the part with at least one bevel based upon the enhanced electronic file.

DETAILED DESCRIPTION

In one embodiment of the present advancement, a cutting machine follows numerical control ("NC") cutter paths that are provided to—instead of being determined by—the cutting machine, and a series of NC passes by the cutting machine creates a multi pass weld preparation. In this embodiment, computer aided manufacture ("CAM") files are automatically converted into the required multi pass NC program with no hand programming and no human intervention. Once defined, the CAM files are nested and the parts are cut. In other words, once the desired weld preparation is added to each of the lines and arcs of the original drawing, this may be converted into machine movements in a universal way in an automatic process involving trigonometry, multiple passes of a single torch, and consideration of a number of scenarios for the corners.

All pathing, sequencing, offsets, kerf, feedrates, entries, exits, loops, ramps, transitions, rotations and such may be created entirely by a converting device. The present systems and methods thus may maintain machine independence by separating the desired result from the means with which it is achieved. From an economic point of view, this may add efficiency in information creation, storage, and retrieval. It also may result in a more streamlined process eliminating an entire step in the fabrication process and thus causing an increase in productivity for the fabricator.

Figure 8A:
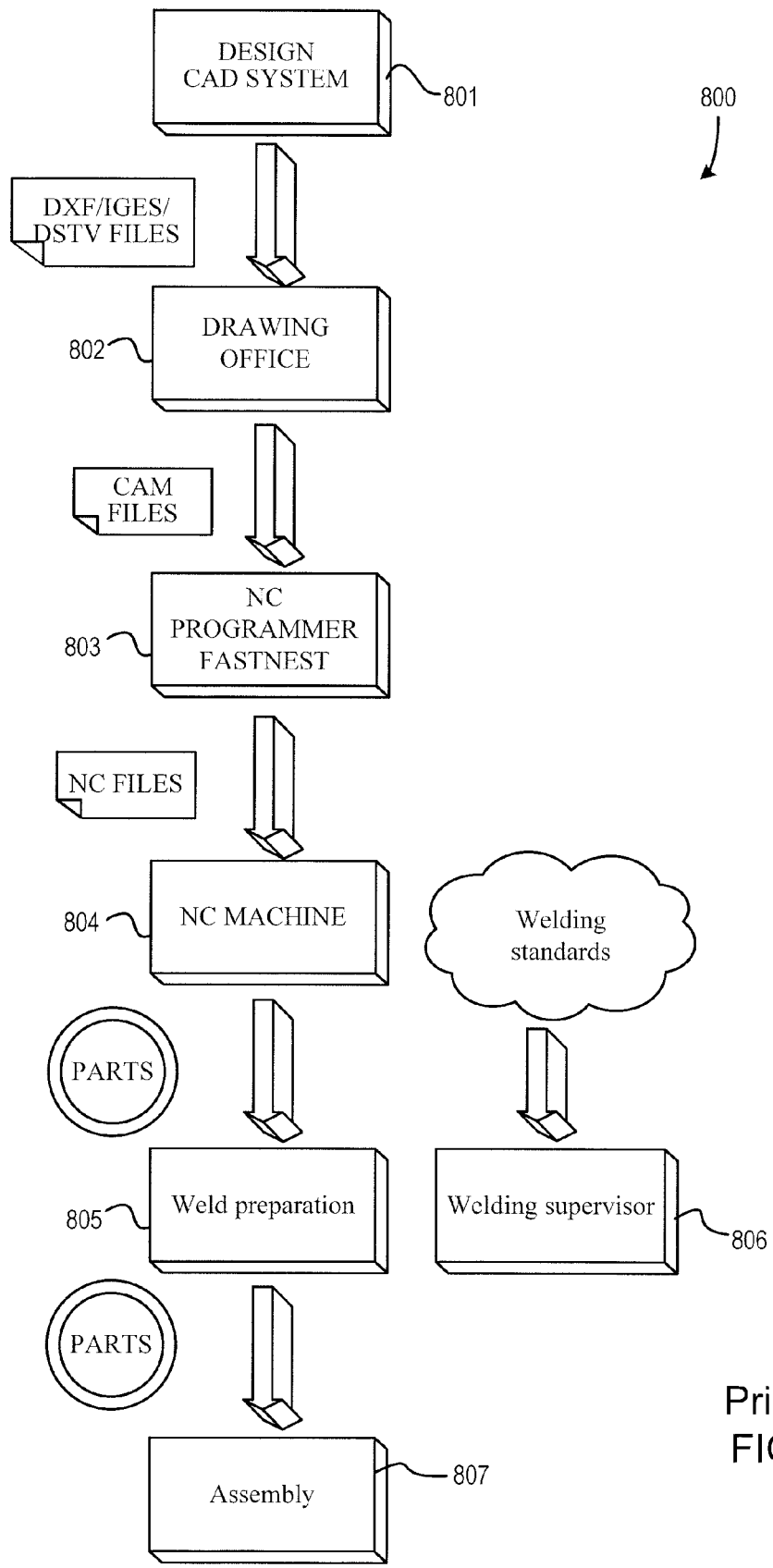
FIG. 8a is an exemplary diagram showing information flow according to a prior art process.

FIG. 8a represents a prior art flow 800 of information used in creating a welded assembly. At a first stage 801, a part is drawn using a computer aided design ("CAD") system. The information then proceeds to a drawing office 802, where the information from stage 801 (i.e., a CAD file) is used to create a CAM file. CAM files are machine independent. This CAM file is then used at stage 803 to create NC files for use in cutting the part from a sheet of material, with the cut being ninety degrees relative to the face of the sheet of material. NC files are generally machine specific. At stage 804, these NC files are used by a NC machine to actually cut the part from the sheet of material. The cut part created at stage 804 is a physical representation of the information in the NC files. At stage 805, the part is prepared for welding (i.e., beveled) utilizing input from a welding supervisor. Information from the welding supervisor is developed at stage 806, and the part may not be prepared for welding until the information from the welding supervisor is provided. The prepared part created at stage 805 is then transferred to stage 807, where the part is assembled (welded) to another part.

Figure 3:
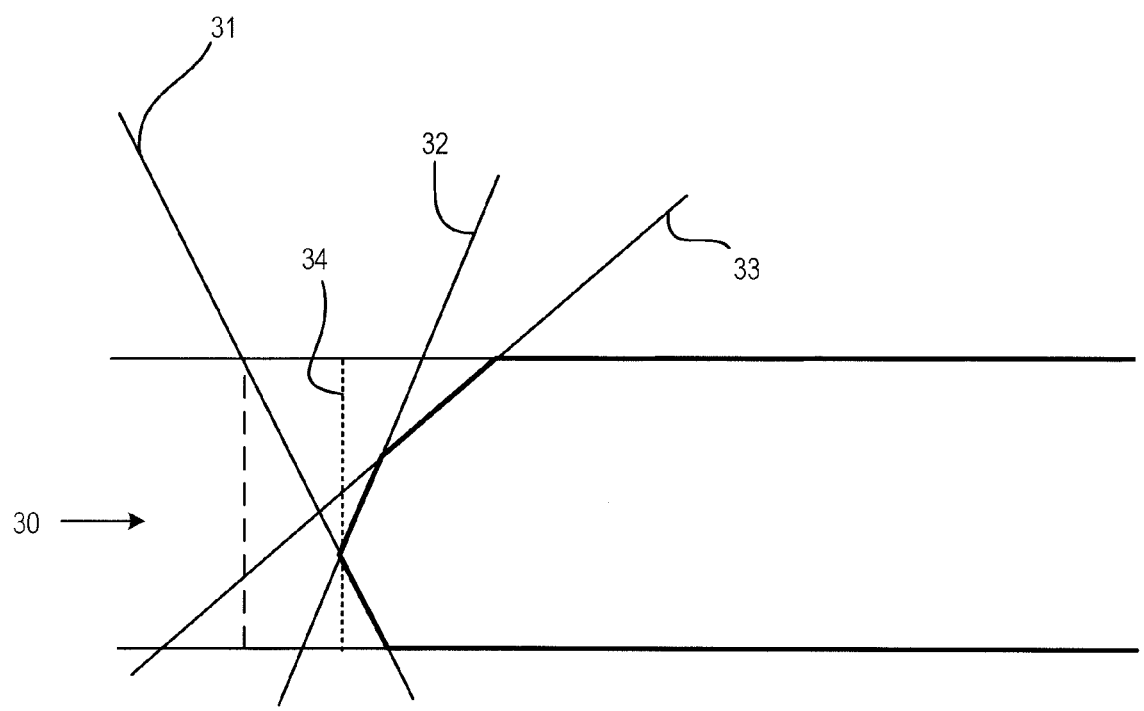
FIG. 3 is a weld profile having zero root gap and showing an under cut, a center cut, and a top cut.
Figure 4:
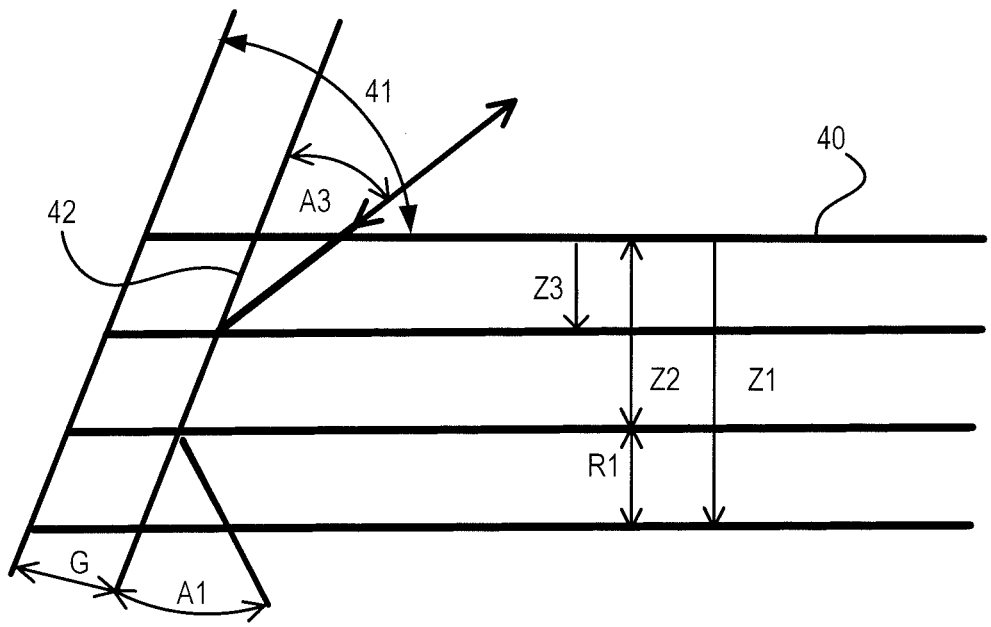
FIG. 4 shows a bevel definition.
Figure 8B:
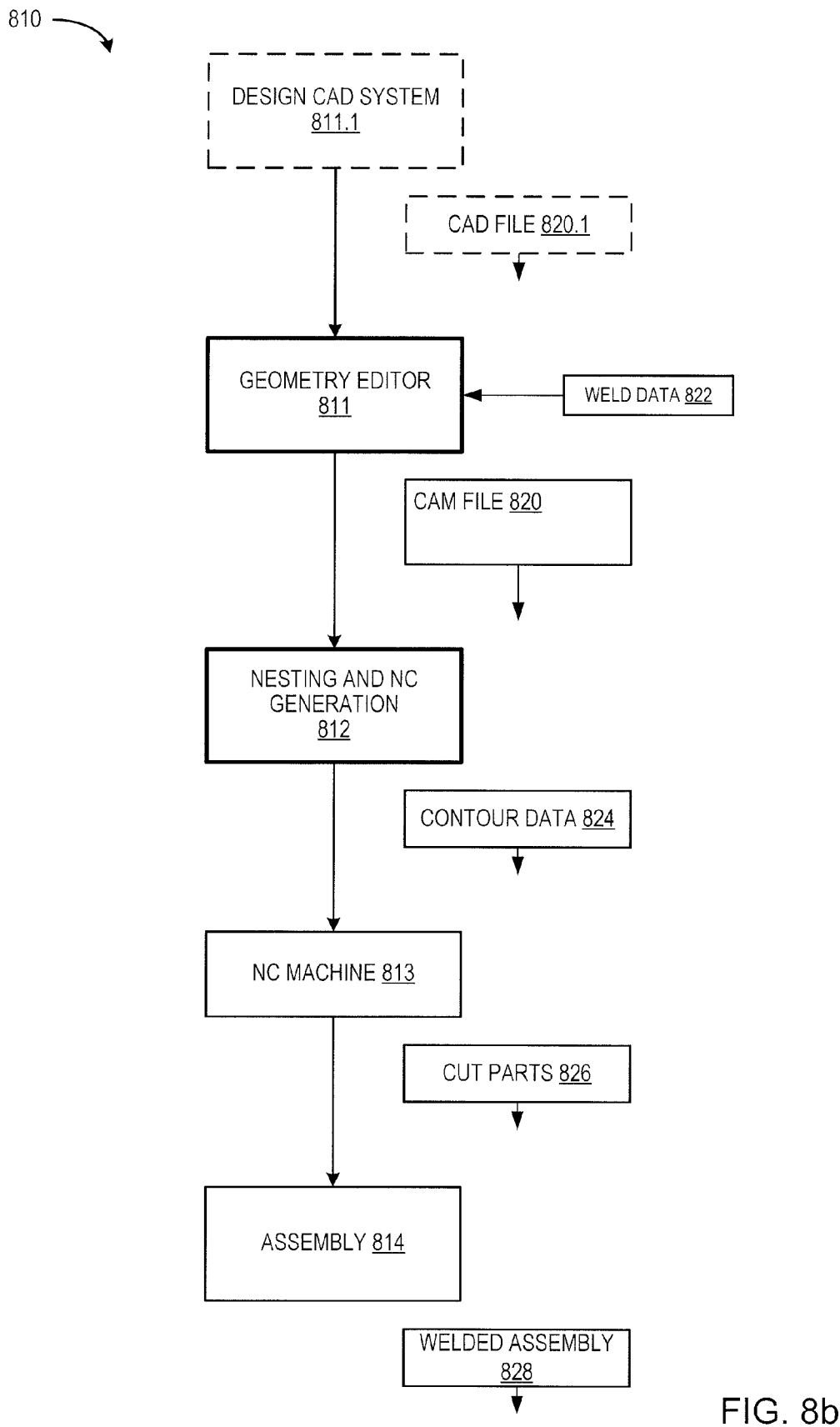
FIG. 8b show exemplary process flow for creating a welded assembly as facilitated by weld preparation software, in an embodiment.
Figure 17:
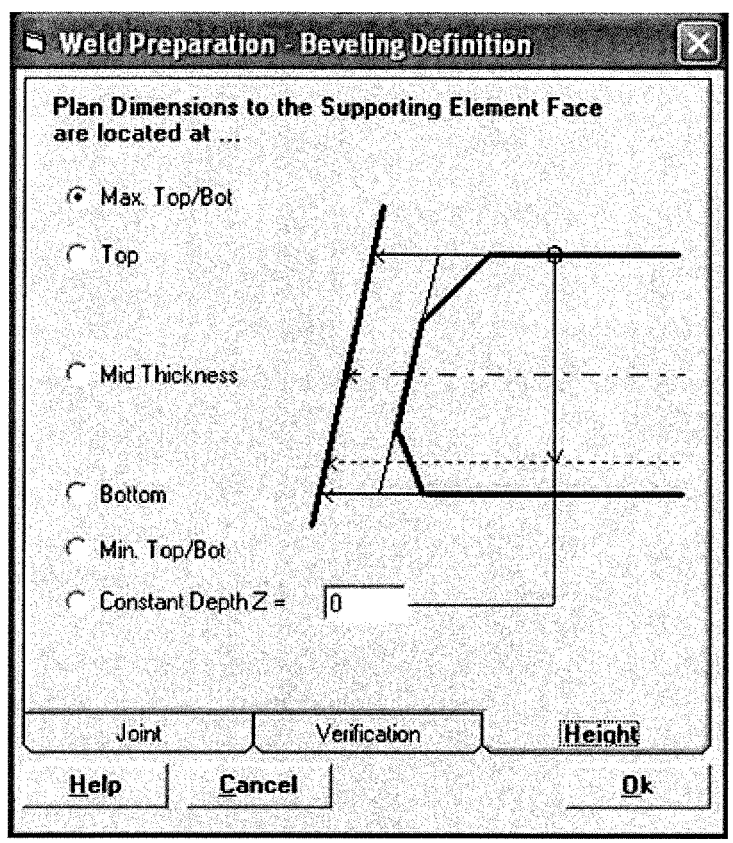
FIG. 17 shows one exemplary screen shot for defining a weld bevel.

FIG. 8b show exemplary process flow 810 for creating a welded assembly 826 as facilitated by software packages 811 and 812. A geometry editor 811 allows a user to both draw shapes (i.e., parts) and import shapes from an electronic description of the parts (e.g., the electronic description typically in the form of CAD file 820.1) created by another CAD system 811.1. Specifically, geometry editor 811 does not only allow the creation of the basic 2D geometry of the part but of the entire 3D geometry. Creation, storage, assembly and transmission of such 3D geometries (between software packages 811, 812) is machine independent. CAD file 820.1 may represent a library of shapes generated by design CAD system 811.1. Geometry editor 811 adds (e.g., embeds or combines) weld preparation information (shown as weld data 822), for example in CAM format, into an enhanced electronic file (shown here as CAM file 820) that defines the drawn shapes of cut parts 826. Specifically, in this embodiment, CAM file 820 represents the definition of parts to be cut by an NC machine 813 and includes weld data 822 that defines the weld preparation for cut parts 826. More particularly, the seven essential parameters of the weld detail (A1, A3, G, R1, Z1, Z2, Z3, as shown in relation to part 40 in FIG. 4) are collected from a user of geometry editor 811, including root gap, and included within CAM file 820. See for example FIG. 17 which shows one exemplary screen shot for defining a weld bevel. As in FIG. 4, the angles of the notches may be relative to the dihedral angle 41 to allow the dihedral angle to change while maintaining a consistent notch shape during the cut. This facilitates input of weld detail for shapes that are subsequently rolled prior to welding, in which the dihedral angle may change constantly along the weld surface. Notably, the center cut 42 shown in FIG. 4 is not perpendicular to the top surface, as required when using the traditional triple head oxy solutions that have fixed vertical center torches. Rather, the preparation of weld surfaces for plates (i.e., parts) which are to be subsequently pressed into shapes and in which the dihedral may roll from around negative forty degrees to around positive forty degrees (e.g., in heavy conical sections) may be accommodated. This means that the angle of line 32 in FIG. 3 can vary along an edge. The angles of groove lines 31 and 33 may be maintained at a constant offset from line 32 and vary as well. This is shown in FIG. 4 where A1 and A3 are relative to the angle of dihedral 41. Allowing the dihedral to be other than vertical is advancement over prior art beveling solutions.

The three-dimension enhanced electronic file or CAM file 820 created by geometry editor 811 may contain both the original geometry plus weld detail attached to each entity and/or movement defined within CAM file 820. CAM file 820 may be transmitted from place to place as a complete description of cut parts 826, including all weld preparation detail, in a machine readable form. For example, each line defined within the ENTITIES section of CAM file 820 may be a distinct entity; entities which are LINE or ARC entities may be useful to the current advancement. In one embodiment, there is one line per entity, which contains such coordinates as the start point, the end point, the center, and the additional six parameters of the weld preparation definition. In this embodiment, each entity has the desired weld preparation embedded therewith; and therefore there is no need to store the sense of the weld preparation since it is defined by the entity. If the entity forms the outside boundary of the part, it may be presumed that the associated weld preparation profile specified for the entity is an outside profile. If the entity bounds a hole in the part, it may be presumed that the associated weld preparation profile specified for the entity is an inside profile.

Figure 5:
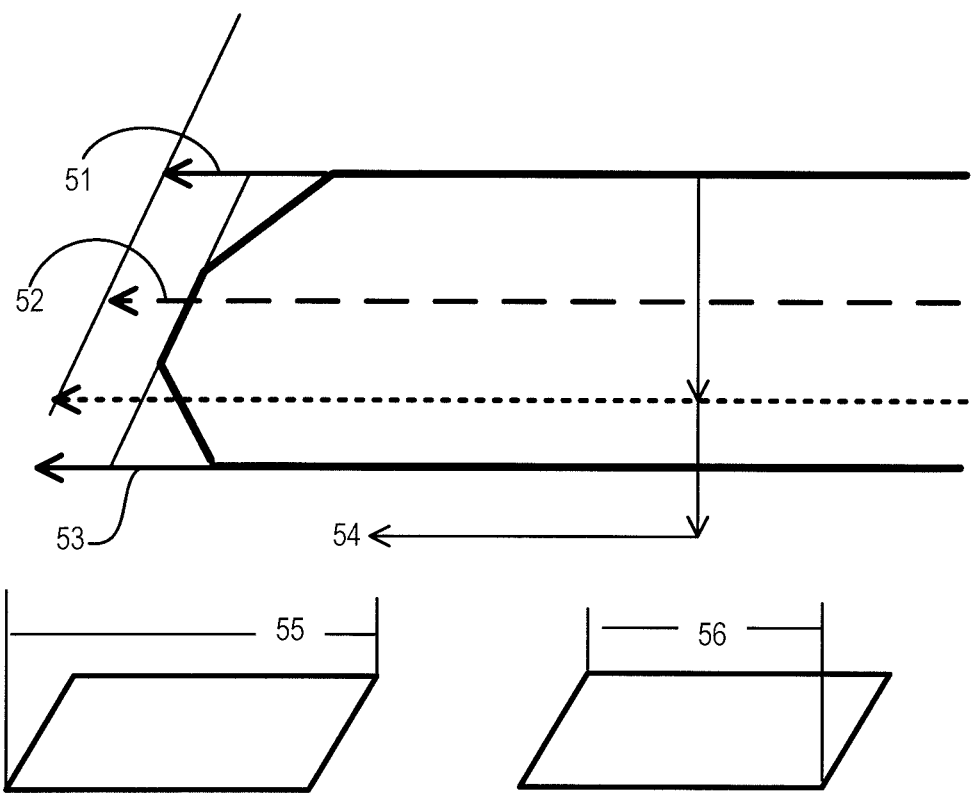
FIG. 5 is a weld preparation showing six common plan views.
Figure 6:
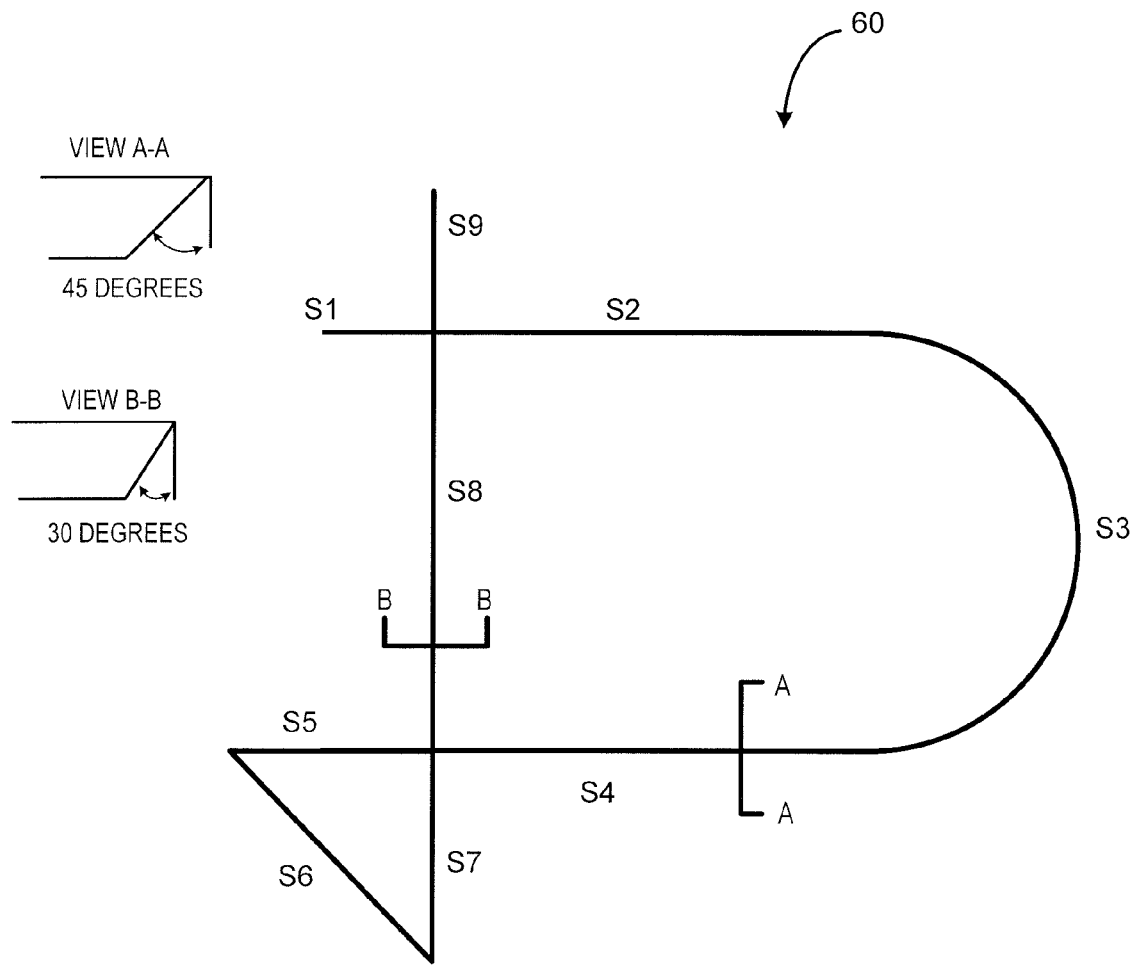
FIG. 6 shows a prior art ESAB programming example demonstrating manual programming of a single pass bevel and traditional triangle looped corners.
Figure 7:
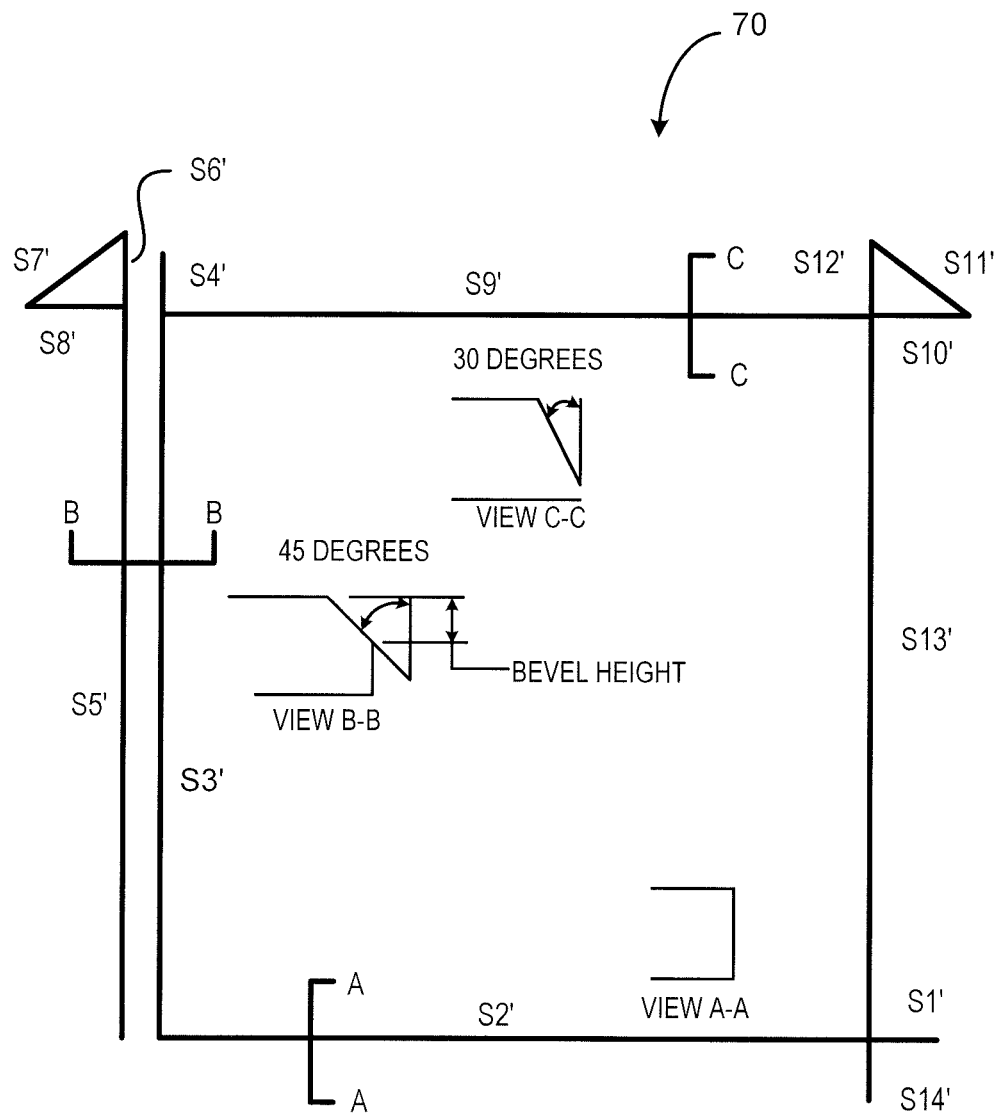
FIG. 7 shows a prior art MESSER programming example demonstrating a double pass bevel and the need to establish two offset cutter paths.
Figure 14:
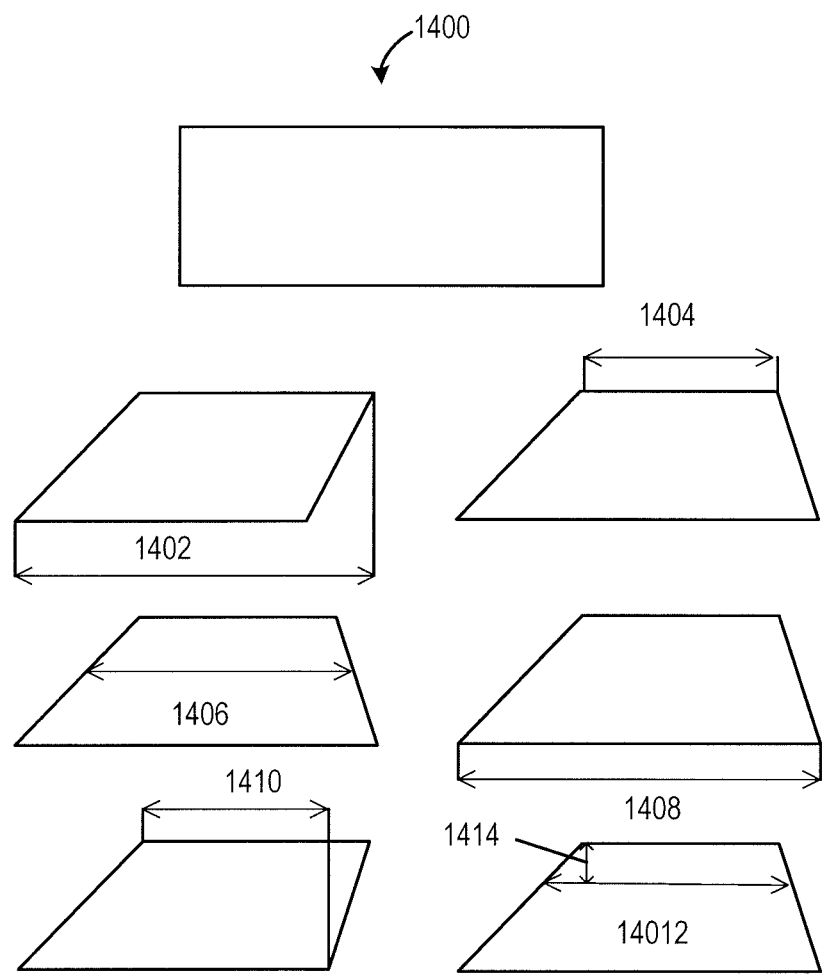
FIG. 14 is a weld preparation showing six common plan views.

As shown in FIGS. 5 and 14, a CAD drawing in plan shows dimensions which may be drawn according to at least six common methods. Even a simple rectangular shape in plan may be dimensioned many ways once the edges are not vertical. Unlike prior art beveling systems, these plan dimensions may be used herein unchanged. The different plan dimension choices are a consequence of the view of the designer of an entire assembly, and such an assembly may consist of hundreds or thousands of such parts. In prior art beveling systems, all drawings had to convert to the maximum dimension 1402 (FIG. 14). By including the transformations required to create the correct tool path on the top of the plate and accommodate these six views 1402, 1404, 1406, 1408, 1410, 1412 of the components, the entire process of calculation and redrawing of all components may be eliminated.

CAM file 820 forms a complete definition of both the original entities and the desired edge preparation that is largely independent of both the incoming plan view of the parts and the method of preparation of the parts, thereby avoiding various problems. It provides 3D design of the part including the shape edge of the part so that the part may be prepared for assembly by welding. For example, as shown in FIG. 5, there are six distinct ways of drawing the same part since a rectangle with weld preparation has different overall dimensions at different depths from the top surface: 1) top 51; 2) mid thickness 52; 3) bottom 53; 4) constant depth 54; 5) maximum overall size 55; and 6) minimum overall size 56. Currently, many NC controls assume the defined shape to be the maximum overall size, which typically requires the redrawing of parts at an enormous cost. Because the current advancement includes a complete part definition, this may be avoided. In addition, production issues which do not impact the desired shape may be resolved during definition by geometry editor 811. For example, a given pass may be omitted as not practically efficient because too little material is removed or because it is wasteful of raw material.

CAM file 820, having both the original two dimensional drawings and the additional information for weld preparation, proceeds from geometry editor 811 to an Nesting and NC generation software 812. Nesting and NC generation software 812 may perform various functions. For example, it may convert the raw but simple geometry of CAM file 820 into up to three passes of the cutting torch with different cutting torch tilt; and it may allow the nesting of such CAM files onto a plate so that multiple parts may be cut from one plate without interference.

Figure 9:
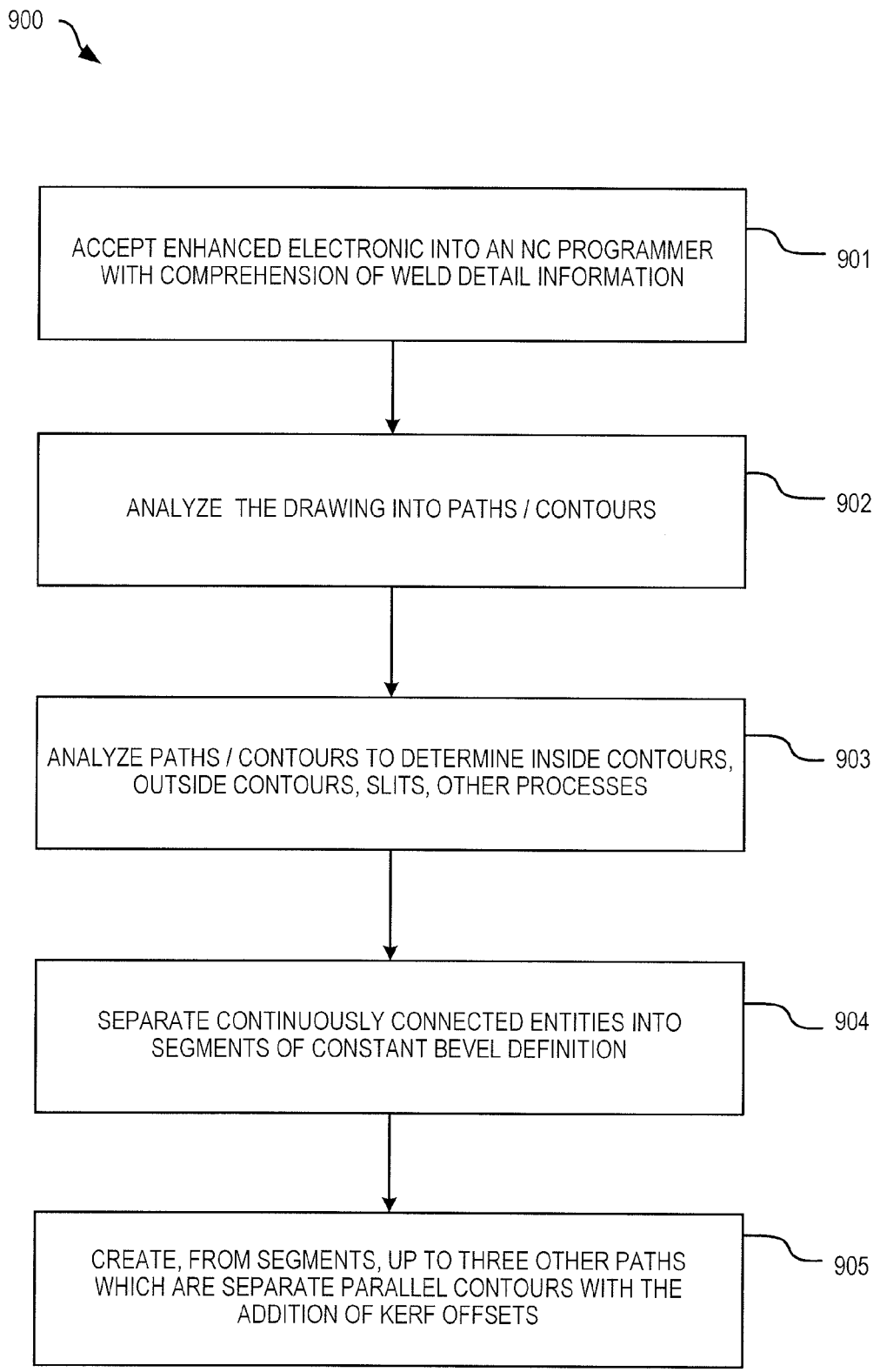
FIG. 9 shows steps for automatic conversion of a CAM file into multiple contours according to an embodiment.

In one exemplary embodiment, the automatic conversion of CAM file 820 into multiple machine contours (i.e., NC files), shown as contour data 824, utilizes method 900, shown in FIG. 9. Method 900 is, for example, implemented within Nesting and NC generation software 812, FIG. 8b. In step 901, method 900 accepts the enhanced electronic file into an NC programmer with comprehension of weld detail information. In one example of step 901, CAM file 820 is accepted by Nesting and NC generation software 812. In step 902, method 900 analyzes the drawing into paths or contours. This may be a non-trivial matter, as the drawing may be complex, contain many holes, parts within parts, or nested parts. Paths may be identified, for example, as collections of entities forming curved, closed or not. In step 903, method 900 analyzes the contours of step 902 to determine inside contours, outside contours, slits, and/or other processes such as marking, text, and drilling, for example. In step 904, method 900 separates continuously connected entities into segments of constant bevel definition. In step 905, method 900 creates, from these segments, up to three other paths which are separate parallel contours with the addition of kerf offsets. More particularly, this may include adding bumper entities based on such external bevels as indicated by top bevels where the bottom of the cut can exceed the final boundary of the part.

The addition of bumper entities may be used to prevent the parts from colliding in the nest. Machine movements may be converted to movements on the top of the plate. For ease of programming a NC machine, the true extents of the parts may not be immediately known for automatic or manual nesting. Bumper entities may allow the nesting system to have an awareness of the true limits of the parts. For example, a top beveled disc of 40 mm thickness with a 45 degree bevel will generally be approximately 40 mm larger than it appears.

While NC files can be generated at any time, the conversion back from three-pass NC code to the original geometry may be difficult and undesirable. CAM file 820 format may be a machine independent format thereby allowing the final processing to occur on a variety of machines and processes as noted above. Though it is possible to store libraries of NC code for a specific machine and to utilize those libraries by geometry editor 811, this may be disadvantageous. Among other things, the proliferation of NC languages and interpretations of the general XY and AC axes may make such a library of less than optimum usefulness. For example, some existing manufacturers call the rotary axis R while others define the rotation (shown in FIG. 10) in the reverse with clockwise positive. These differences (as well as others) make a set of NC code a less than optimal storage mechanism. Therefore, it is beneficial to maintain the machine independent format of CAM file 820 until translated by Nesting and NC generation software 812 into contour data 824, as shown in FIG. 8b, to allow CAM file 820 to be used with a variety of NC machines and processes.

Figure 11A:
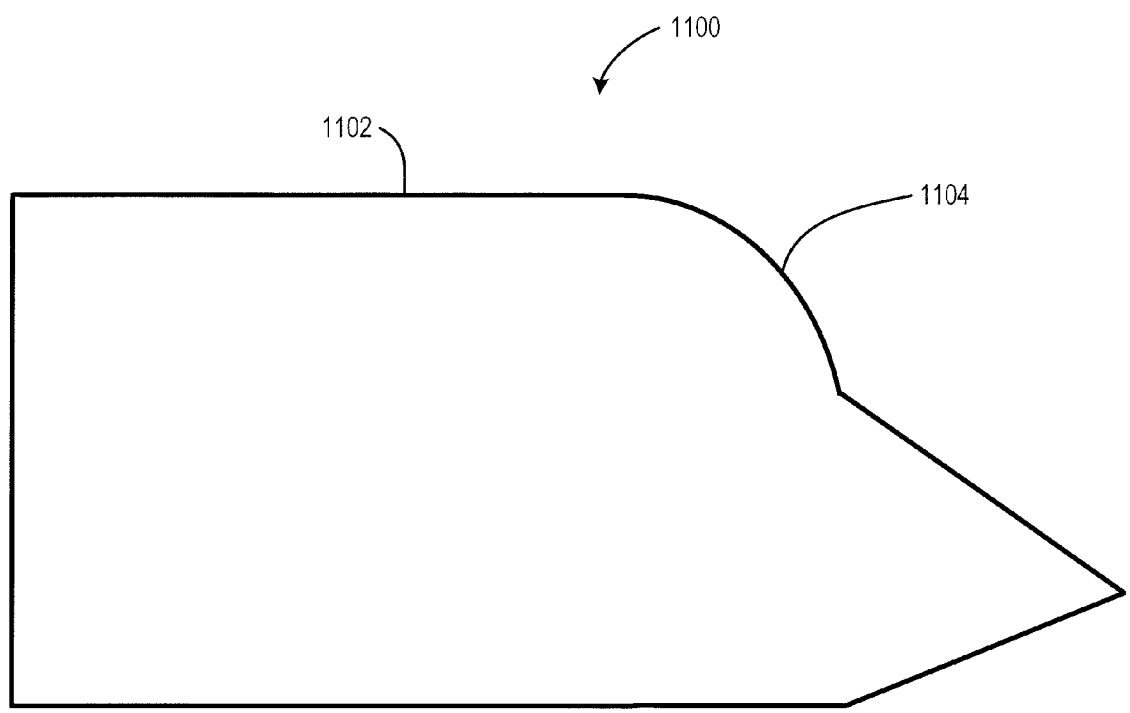
FIG. 11a is an exemplary drawing of a part to be beveled showing raw drawing entities.
Figure 11B:
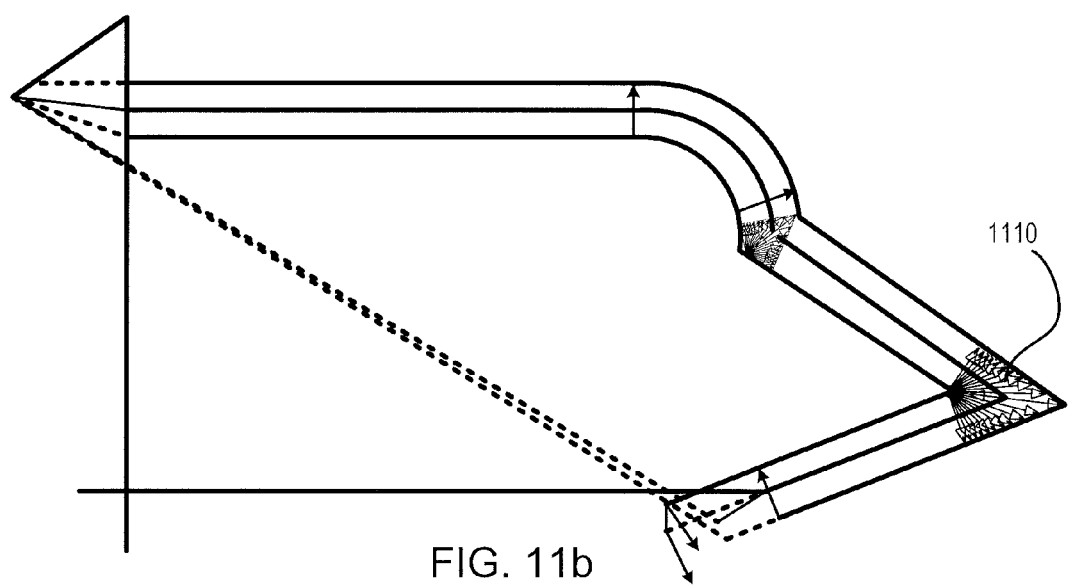
FIG. 11b is the example of FIG. 11a showing torch simulation arrows.
Figure 11C:
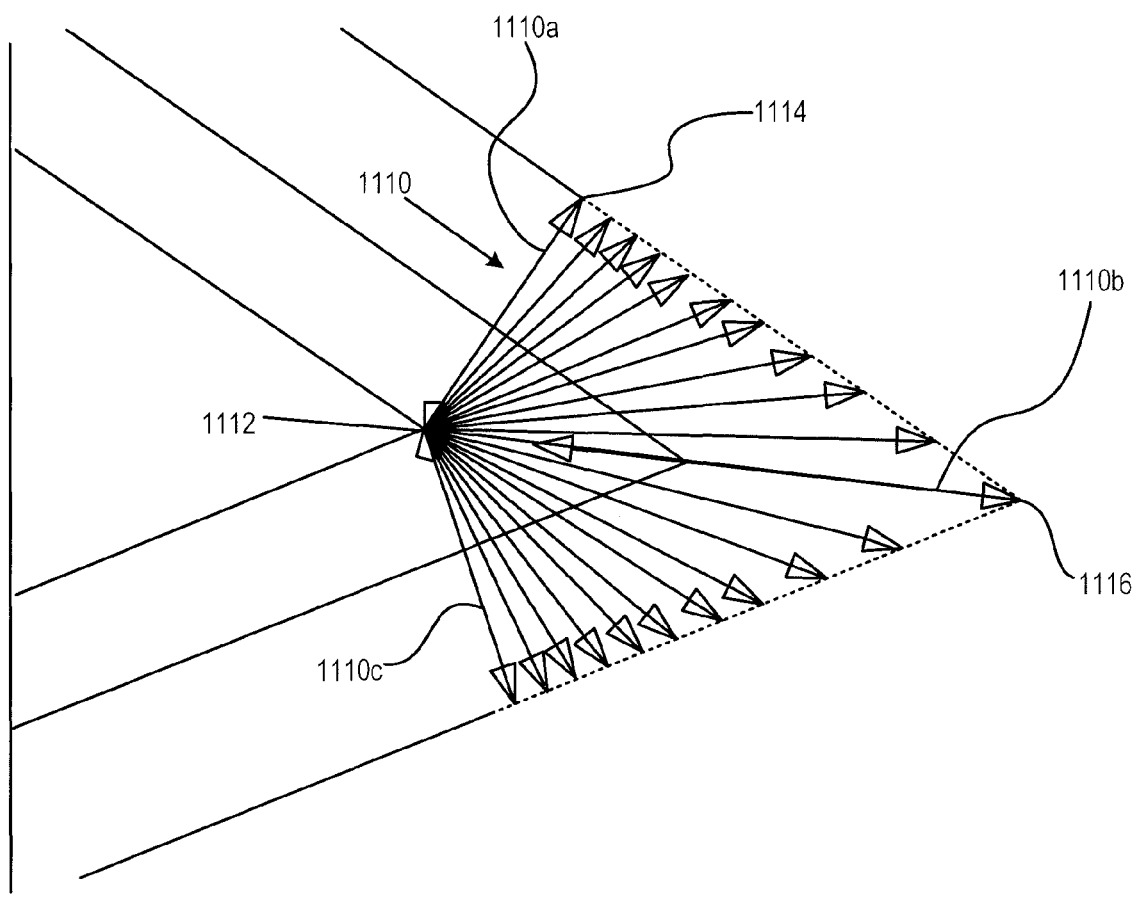
FIG. 11c is a detailed view of FIG. 11b.

To accommodate the many different beveling scenarios, a few variables may be defined. For example, the axes A regarding torch tilt (FIG. 2) and C regarding torch rotation (FIG. 10) may be used to supplement the X and Y axes relating to planar movement relative to the top of the plate. These variables may be utilized together in many combinations, and the behavior of these combinations may be beneficially employed in the creation of corners and intersections. Example combinations and commands are as follows, with G indicating a general NC command as commonly known in Word Address and equivalent coding being generally available in the common European ESSI format:

a) Lines 1102 or arcs 1104 as conventionally represented in NC programming: GXY alone. These features are shown, for example, in drawing 1100 (FIG. 11*a*).

b) Rotate and tilt without machine movement: GAR, GA, and GC. This feature is shown in the many torch simulation arrows 1110 in FIG. 11*c*, for example, that depict top beveling with simultaneous changing of R and C from a point 1112 to simulate the intersection of two bevel planes.

c) Rotate and tilt with machine movement: GXYAR. This feature may be demonstrated by vectors 1110*a*, 1110*b*, and 1110*c* such as in FIG. 11*c*, for example. The movement from point 1114 to 1116 in FIG. 11*c* is a straight line in the XY plane. During the execution of this movement, it is required that R and A are interpolated smoothly and linearly so that they reach the end angles at exactly the same time that the machine reaches point 1116. This is an essential requirement of a beveling machine, because if XYAR are known at the start of a movement, it is a requirement that all four are interpolated linearly from these start values to the end values. This means that halfway along the XY movement or arc, the values of AR are exactly halfway between the known start values and the desired end values.

There may be a feedrate address that allows the generation of varying feedrate. This may be done by calculating the effective thickness T2 at torch tilt angle φ by the simple formula T2=T/cos(φ). A table of feedrates against thickness determined separately may then be used to calculate the exact feedrate required. There may be no need to have a separate value of the offset torch radius (or Kerf as it is commonly known). This offset may be added in the generation of NC codes to the offsets which come from the torch tilt and from the various methods in which the entity may be defined relative to the top of the plate, as in FIG. 5. The offset for the radius of the torch may be calculated from two factors. The apparent radius may be increased both by the reduced feedrate and by the increased angle of incidence. The torch radius may be determined by using a table of thickness and kerf for vertical cutting and the apparent depth used to determine the radius of the cut. This has to be increased further by allowing for the angle of incidence so that K2=K/cos(φ) where K2 is the new kerf and K is the kerf as calculated from the table for the apparent thickness of the plate.

Figure 1:
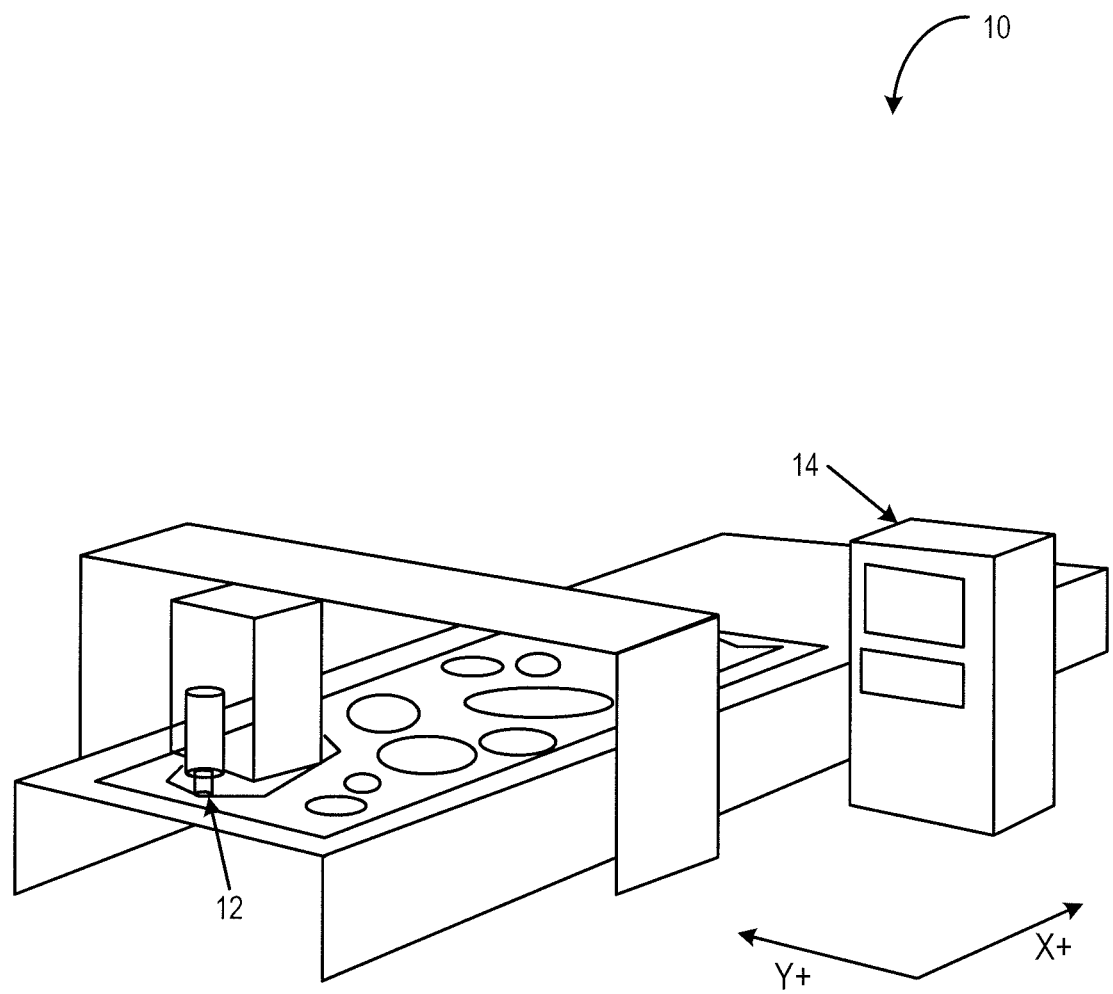
FIG. 1 is a prior art arrangement of a numerical control (NC) machine showing XY axes, NC control, and a single torch.
Figure 2:
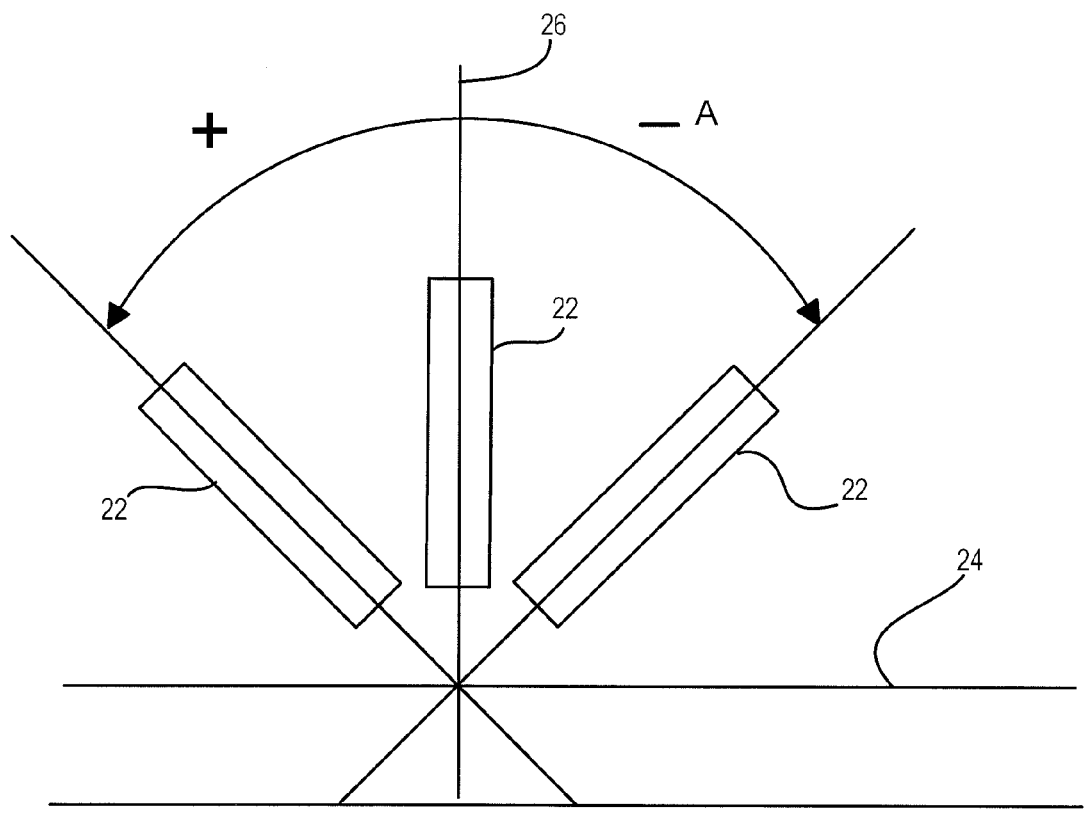
FIG. 2 shows torch axes for tilt of a torch.
Figure 10:
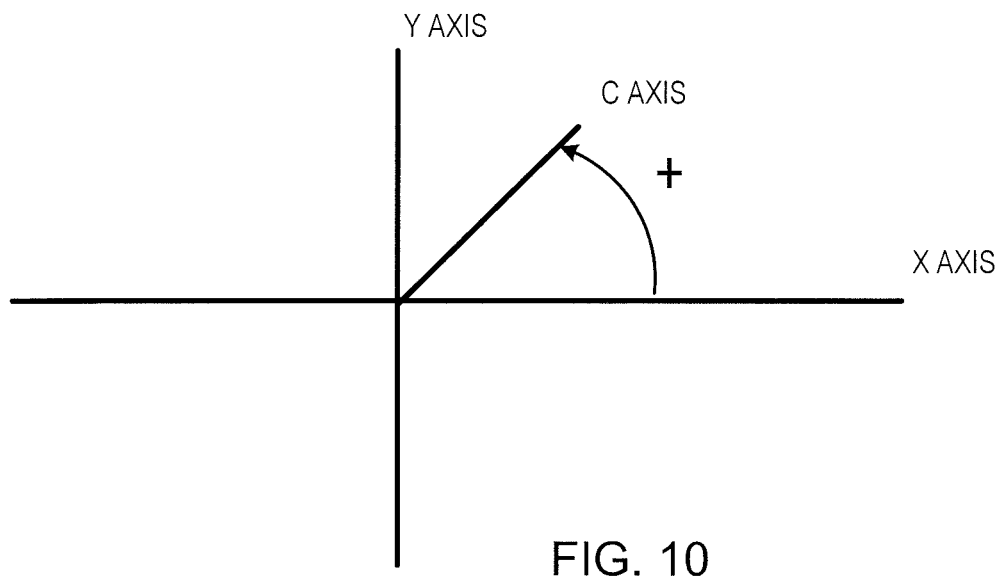
FIG. 10 is a top view of a torch showing X, Y, and C axes; positive is shown counter-clockwise from the X axis.

Contour data 824 (i.e., NC files) created by Nesting and NC generation software 812 is sent to an NC machine 813, as shown in FIG. 8*b*. NC machine 813 processes contour data 824 to cut desired parts (shown as cut parts 826) from a sheet of material. Cut parts 826 may represent one or more parts cut from a sheet by NC machine 813. There are important machine considerations which should be observed for NC machine 813 to work satisfactorily with the current advancement. Among other things, in an embodiment, NC machine 813 includes the capability of holding the torch and both rotating it and tilting it (as shown in FIGS. 2 and 10) and provide the ability to directly program the rotation axis C and the tilt axis A (as shown in FIGS. 2 and 10). The tilt and rotation are around an XY point on the top of the plate, and the cutting torch is able to tilt without changing the critical distance from the torch tip to the plate; as all XY paths are determined to a point on the top of the plate, this point should not move as the torch is tilted or rotated.

For slow piercing systems, the ability to continue without re-piercing is important but not essential. This means that an Edge Start M18 command on the NC control may be needed for maximum performance. Beveling is usually most important on thick plate, for which the issue of piercing becomes a limiting one for both plasma and oxy cutting because of the time and costs involved. The introduction of an edge start scenario and matching M auxiliary function is thus highly recommended.

NC machine 813 may have mechanical or electro mechanical height control. As machines may not be perfectly horizontal and the plate may itself have bends, a height control may be used to prevent damage to the machine. It may also be used to accurately maintain the rotation center if the plate top surface is higher or lower. For plasma, the common Automatic Voltage Control (or AVC) may not be adequate, because on subsequent passes much material may be missing and the torch height may change, thereby altering the geometry of the edge and the pass position on the top of the plate. Height control is more critical to beveling than to vertical cutting where errors in torch height may produce lower quality cutting but do not change the geometry of the part. Exemplary height controls that may be utilized (among others) include a mechanical trailing foot made by ESAB and a control marketed by Messer that measures height at points across a plate and recalls those positions during the execution of a NC program. By adding the above features and complying with the current disclosure, the vast majority of the current plate cutting NC machines may be able to produce weld ready parts, eliminating an entire stage in the creation of welded structures and making multi pass single torch beveling the standard for most cutting, as it may be as easy to program, nest, and perform as normal cutting.

Fewer than one percent of currently manufactured XY profile machines are estimated to be capable of beveling, though such machines do exist. For such machines, the existing accommodations for kerf, feedrate, and especially automatic XY offsets with varying bevel tilt, should be turned off as they are generally inadequate or wrong. However they may optionally be left on and their corrections compensated in the output of the invention so that operators can continue to use existing techniques for machine operation including manual adjustment of feedrates and cut width. Nevertheless, these machines do generally contain the ability to control A and C axes and can be used for limited applications depending on the complexity of their languages. To accommodate those existing machines, inbuilt orthogonal following can be used with special commands to allow direct setting of rotation on entry and exit from beveled contour. Though less powerful than direct R rotation programming on each entity, this approach may be adequate for many applications. Inbuilt varying feedrate which is automatically set from torch angle may be used if correct. Varying kerf may also be used, but many kerf systems may have difficulty in their calculations with the stop and start nature of the programming disclosed herein. One problem is that many existing kerf systems do not offset the initial point, but instead apply kerf along the progress of the first movement. This may produce problems in ascertaining the exact position of the torch in a machine independent way. Further, many existing kerf systems offset the first and last movements in a contour but do not shorten such movements. This may produce problems in internal notching (internal notching is shown in FIGS. 12*a*-12*d*, for example).

Cut parts 826 created by NC machine 813 may then proceed to an assembly stage 814 (FIG. 8b), where cut parts 826 are assembled (i.e., welded) together and/or to one or more other parts to form a welded assembly 828. Notably, a process using process flow 810 is more automated than prior art beveling process using the flow 800 of information shown in FIG. 8a, and may be quicker and/or more efficient.

Figure 16:
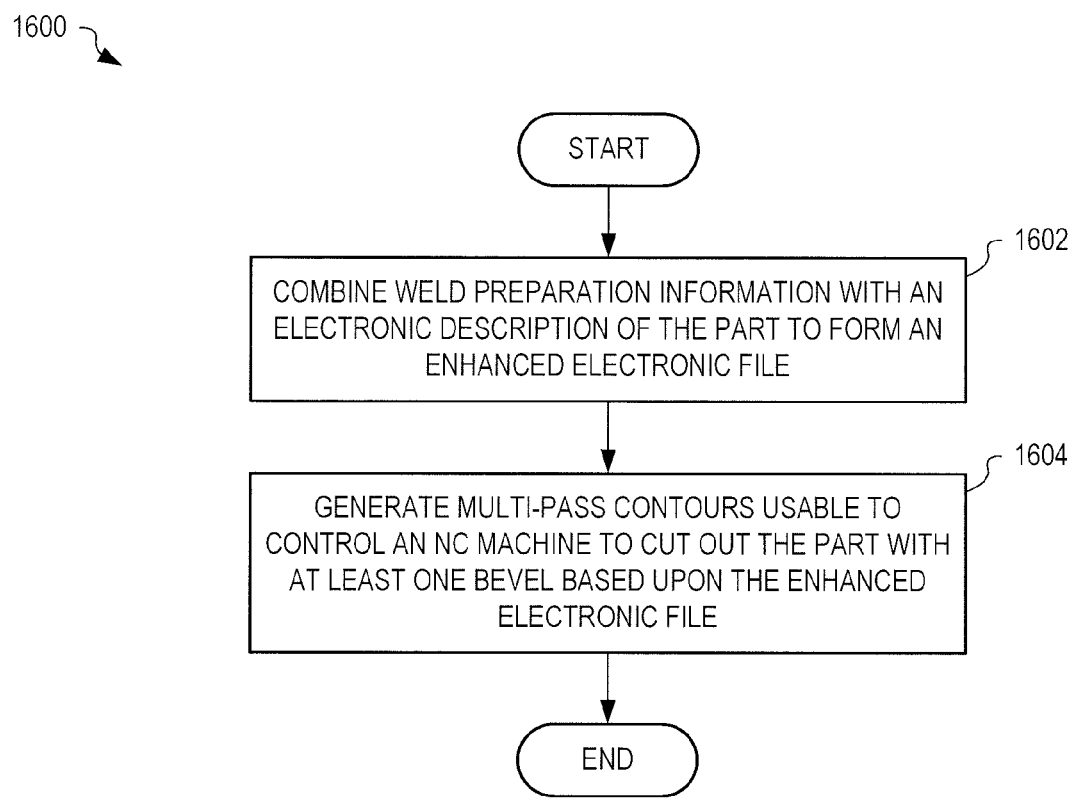
FIG. 16 is a flowchart illustrating one method for generating multi-pass contours for controlling a NC machine to cut out a part with weld preparation.

FIG. 16 is a flowchart illustrating one method for generating multi-pass contours for controlling a NC machine to cut out a part with weld preparation. Step 1602 of method 1600 may be implemented within geometry editor 811 of FIG. 8b and step 1604 may be implemented within Nesting and NC generation software 812. In step 1602, method 1600 combines weld preparation information with an electronic description of the part to form and enhanced electronic file. In one example of step 1602, geometry editor 811 combines weld data 822 and CAD file 820.1 to form CAM file 820. In step 1604, method 1600 generates multi-pass contours usable to control an NC machine to cut out the part with at least one bevel based upon the enhanced electronic file. In one example of step 1604, Nesting and NC generation software 812 generates contour data 824 that is usable to control NC machine 813 to produce cut parts 826 based upon CAM file 820 with weld data 822.

Figure 12A:
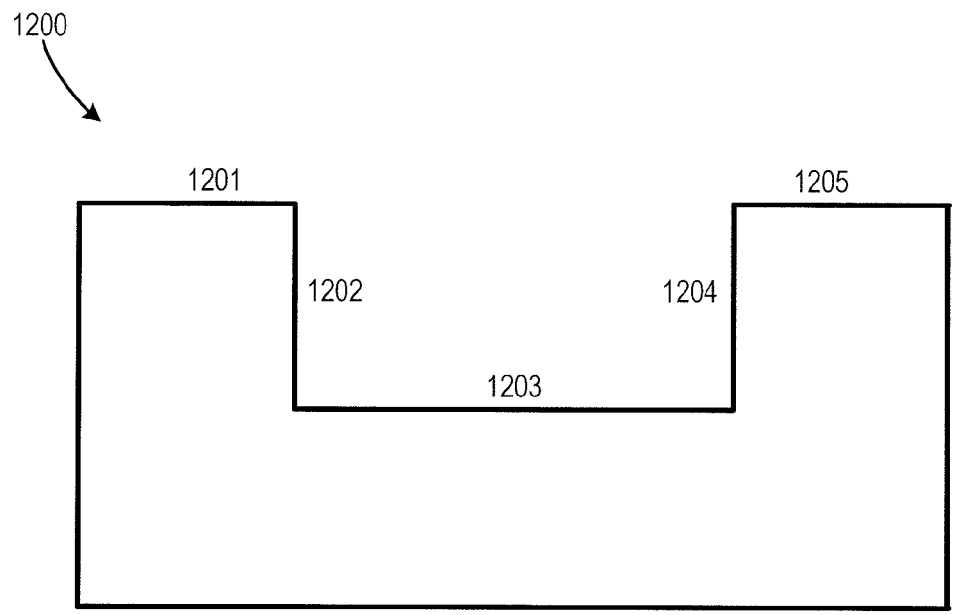
FIG. 12a is a single pass notch example showing raw drawing entities.
Figure 12B:
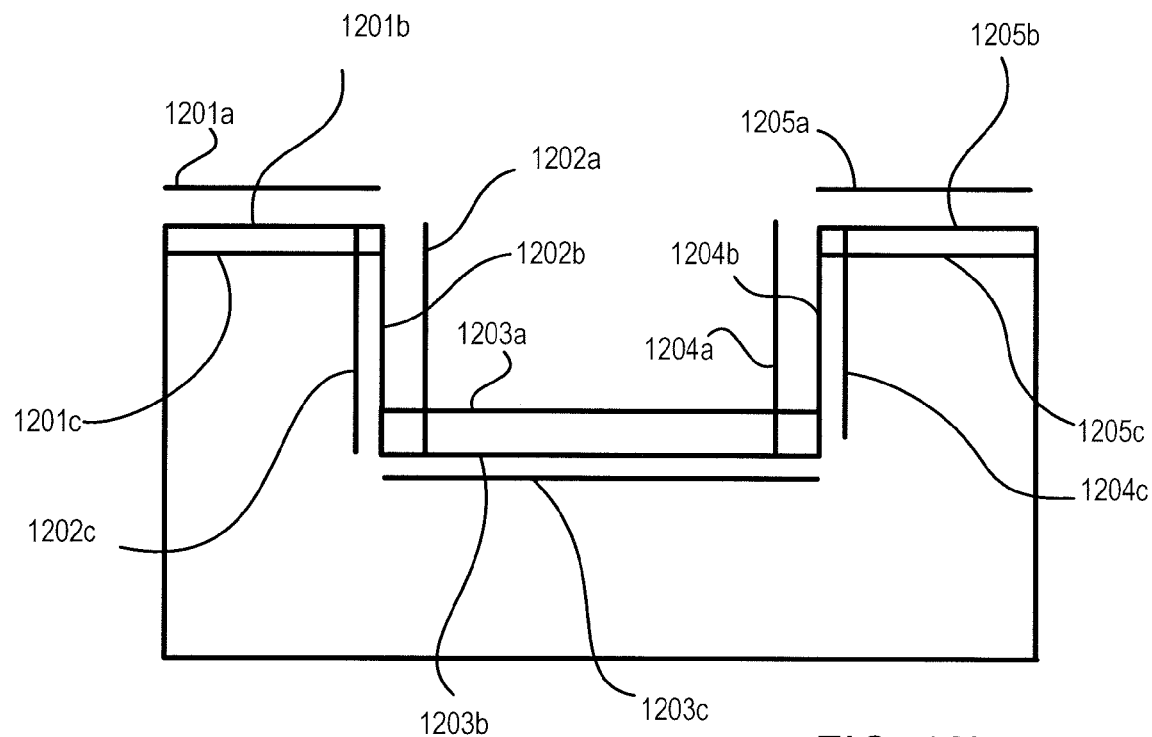
FIG. 12b is the example of FIG. 12a showing offset contours.
Figure 12C:
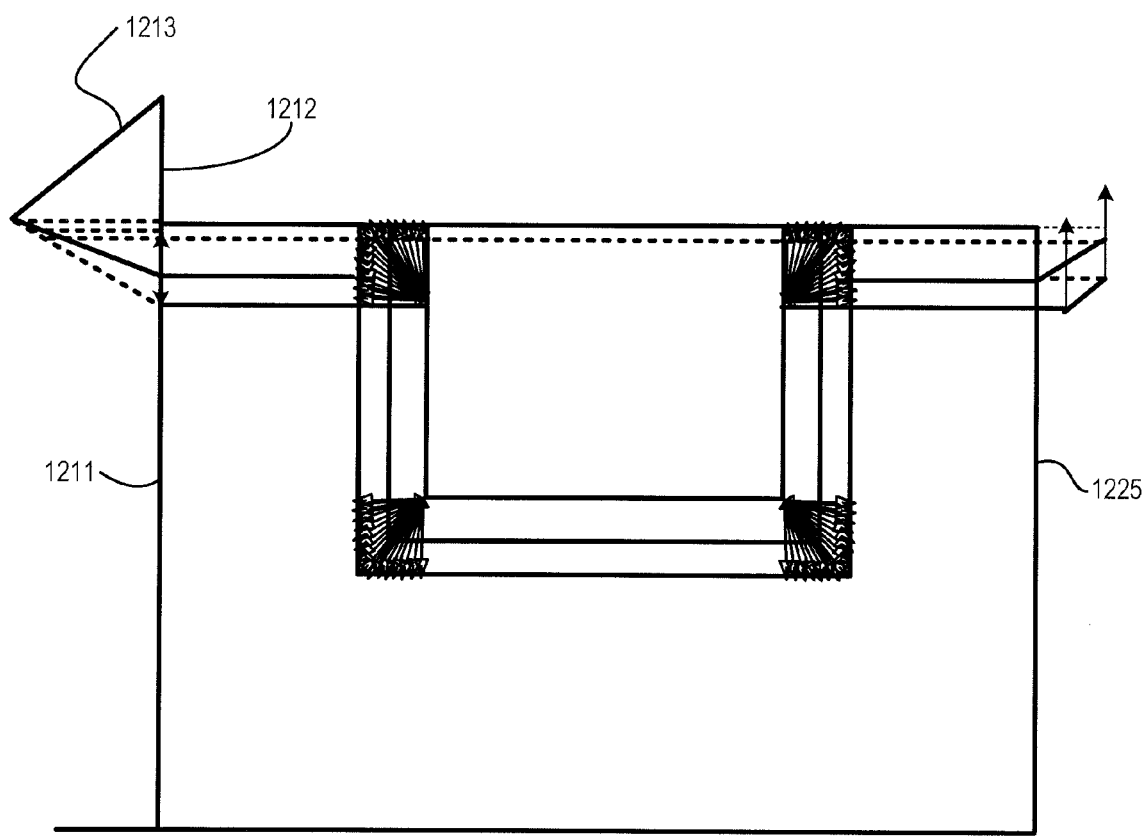
FIG. 12c is the example of FIG. 12b showing offset contours joined into a linked path.

FIGS. 12a through 12d show exemplary steps of Nesting and NC generation software 812 to convert CAM file 820 into contour data 824 (i.e., into multiple NC paths/contours). In FIG. 12a, a contour 1200 is broken into a series of segments 1201, 1202, 1203, 1204, 1205 of constant bevel specification. For each segment, offset segments are determined from the seven parameters of the weld specification and the number of passes (including required and requested passes). The offsets calculated for the tilted torch radius are shown in FIG. 12b as paths 1201a, 1201b, 1201c, 1202a, 1202b, 1202c, 1203a, 1203b, 1203c, 1204a, 1204b, 1204c, 1205a, 1205b, 1205c. The original geometry 1201, 1202, 1203, 1204, 1205 may then be deleted, leaving a series of discontinuous contours. The next task is to join these discontinuous contours into a linked path as shown in FIG. 12c. The extension, joining, and trimming of corners to form a smooth contour is based on simple mathematics common in the art.

Figure 12D:
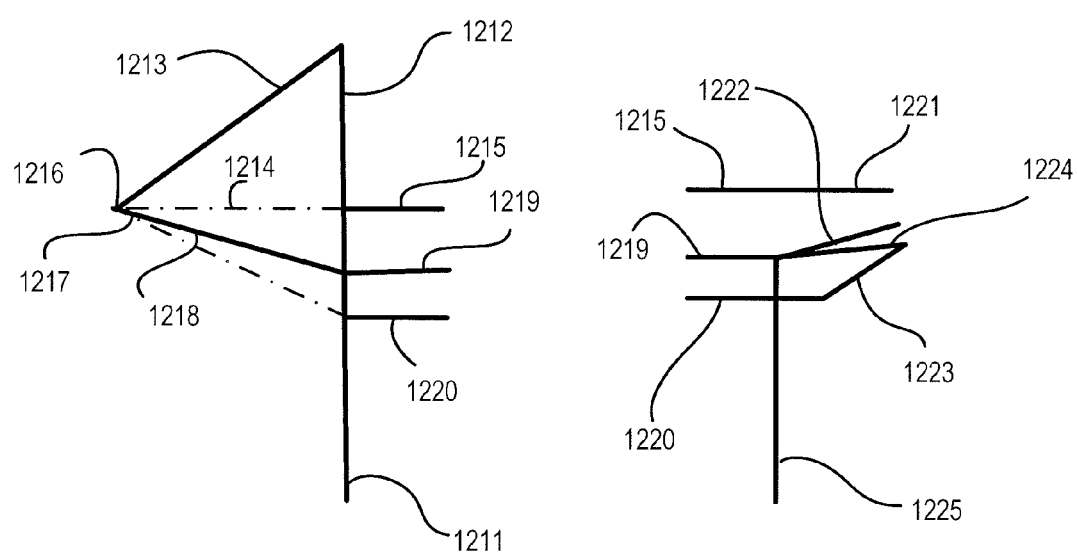
FIG. 12d is a detailed view of FIG. 12c.

Movements (referred to herein as "ramps") are added to the start and end of the discontinuous contours. FIG. 12d shows a detailed view of elements 1211, 1212, 1213, 1214, 1215, 1216, 1217, 1218, 1219, 1220, 1221, 1222, 1223, 1224, 1225 of FIG. 12c. As shown in FIG. 12d, each contour has a "ramp in" and a "ramp out", such as paths 1221, 1222, 1223. To join originally continuous segments, the last ramp out of the previous segment is connected via a triangular construction to the first ramp in of the next segment. The third side of the triangle is referred to herein as a "transition" and can be used for unwinding cables and the like. In FIG. 12d, path 1212 is a ramp out, path 1213 is a transition, and path 1214 is a ramp in. Along the transition (e.g., element 1213 in FIG. 12d), the cutting torch may typically be vertical.

Assuming three segments, the first two passes after the ramp out may be terminated. In FIG. 12d, for example, paths 1215, 1219, and 1220 are terminated in ramp out movements 1221, 1222, and 1223. Path 1223 in FIG. 12d is continued into ramp in 1224 and then down path 1225. This process may continue until the whole contour is turned into a continuous or nearly continuous path, as some gaps may remain (e.g., between the end of element 1221 and the start of the next pass at point 1217). Restart point 1217 in FIG. 12d is positioned exactly one kerf radius from the end of transition element 1213 at point 1216. This utilizes an edge start if such a function is available rather than a full plate pierce. Similarly, restart point 1218 in FIG. 12d is exactly one kerf radius away from the restart point 1217 and again utilizes an edge start.

When corners are reached, there is a need to determine whether the torch is stationary at the corner or moving. For the intersection of two bevel planes, there are two distinct types of corner to be formed. If the torch is stationary, the control is instructed to tilt and rotate to create the pattern of the intersection of the two planes. As the NC control does not know how to interpolate the A and C axes to generate the required shape, a series of GAC commands (perhaps ten into the corner and ten out of the corner, for example) are programmed to create the desired shape. If the torch is moving while creating the intersection of two planes, the torch is made to stop at the point the stationary point is passed. A linear interpolation of both R and C can then be made in the movement to the intersection of the two entities. A reverse movement can be made out of the corner to the point where the stationary point is passed and the new corner resumed.

If one segment is not beveled, a simple triangle may be formed. However, if a corner is an internal corner, such as in FIGS. 12a through 12d, an entirely different approach may be employed. First, it may be determined if successive segments form an obtuse or acute intersection according to the included angle. If an acute corner is present, as in FIGS. 12a through 12d, the approach to the first bevel may use the pretilting of the torch along the vertical cut direction so that the beveled side is approached with the torch already tilted. Similarly, if the following corner or segment end is acute, the first two passes may terminate without ramp out and one kerf diameter short of the end of the entity.

It should be appreciated that the steps and methods described herein for creating a series of complex beveled paths to create the desired ready to weld parts are not exhaustive. However, they are representative of a very large number of practical problems and constitute solutions. For the purpose of describing the workings of the conversion of a CAM file into multiple NC paths, the description is more than adequate to cover most cases, though additional devices for specific situations may be added at any time without changing the basic approach.

Once the paths are converted into segments and the segments are turned into linked sub-paths connected into a whole series of multiple connected paths at different generally fixed tilt angles, the whole may be turned into NC code for a specific machine using its own language to control GXYAC movements.

Figure 13:
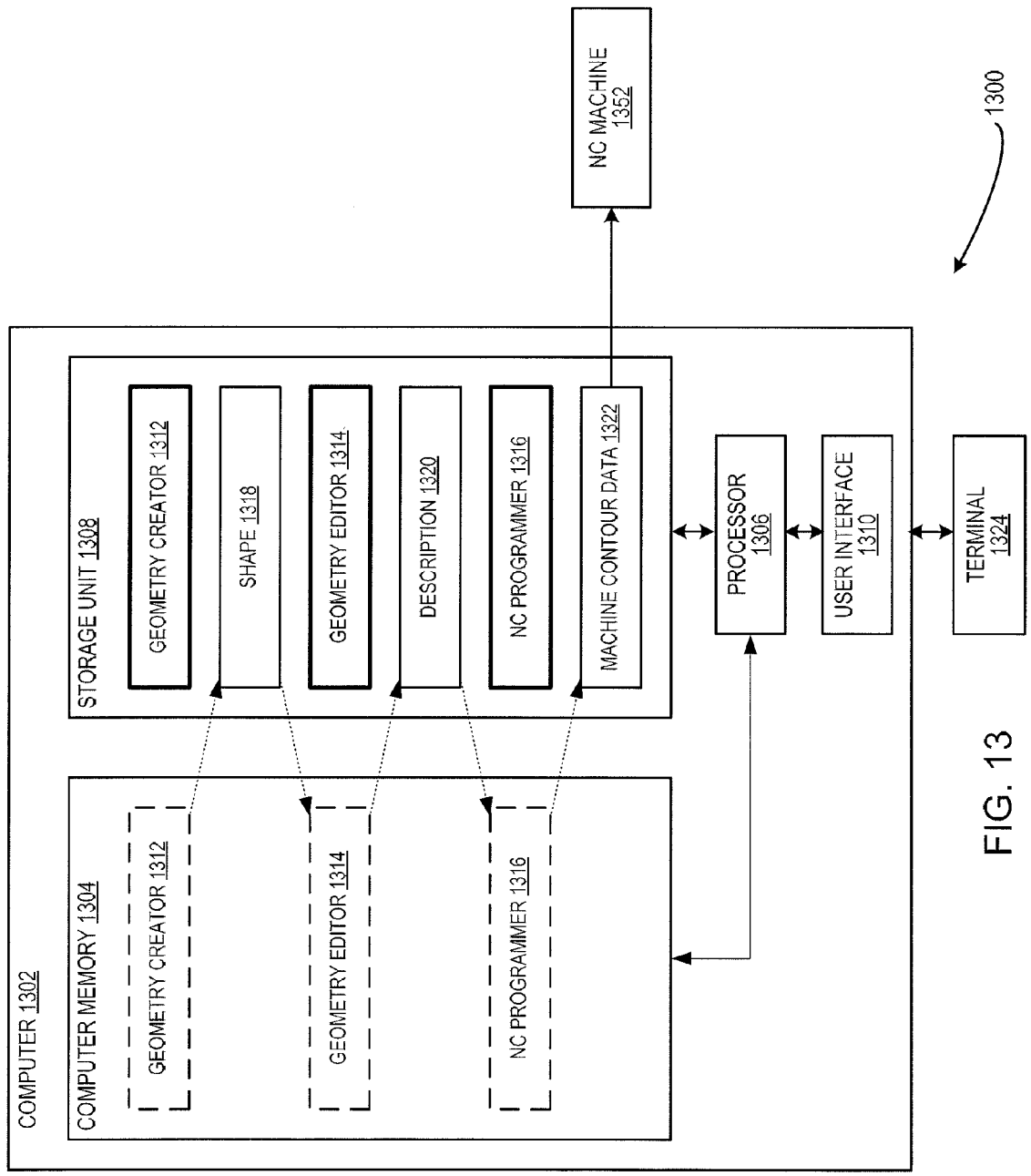
FIG. 13 is a block diagram illustrating an exemplary system embodiment for multi pass weld preparation using a single torch.

FIG. 13 illustrates an exemplary system 1300 that determines machine contour data 1322 for use in controlling a NC machine having a cutting implement (e.g., torch). System 1300 has a computer 1302 with computer memory 1304, a processor 1306, a storage unit 1308, and a user interface 1310. Storage unit 1308 may be, for example, a disk drive that stores programs and data of computer 1302. Storage unit 1308 is illustratively shown storing a geometry creator 1312, a geometry editor 1314, and an NC programmer 1316. Geometry creator 1312, geometry editor 1313 and NC programmer 1316 may represent design CAD system 811.1, geometry editor 811 and Nesting and NC generation software 812 of FIG. 8b. It should be understood that geometry creator 1312, geometry editor 1314, and NC programmer 1316 may be stored in storage units of separate computers and that data may be transferred between those storage units; the transfer of data is known in the art. Geometry creator 1312, geometry editor 1314 and NC programmer 1316 represents software programs that are loaded (illustratively shown in dashed outline within memory 1304) into memory 1304 and executed by processor 1306.

In one example, geometry editor 1314 adds weld preparation information (e.g., weld data 822, FIG. 8b) to a shape 1318 (e.g., CAD file 820.1) to create a complete electronic description 1320 (e.g., CAM file 820) of a desired part (e.g., cut parts 826). NC programmer 1316 converts complete description 1320 into machine contour data 1322 (e.g., contour data 824).

In one example of operation, user interface 1310 connects to a terminal 1324 (e.g., a keyboard and display) external to computer 1302. Through terminal 1324 and user interface 1310, a user interacts with geometry creator 1312 to create shape 1318, interacts with geometry editor 1314 to add weld preparation information and create complete electronic description 1320, and to instruct NC programmer 1316 to generate machine contour data 1322.

System 1300 may optionally include an NC machine 1352 that has a single cutting tool (e.g., a cutting torch). Computer 1302 connects to and controls NC machine 1352 to make multiple passes to prepare a part with weld preparation (i.e., with bevels). The single cutting implement of NC machine 1352 is movable in an XY plane, rotatable, and tiltable as controlled by machine contour data 1322. Machine contour data 1322 may be provided to NC machine 1352 in various manners, the transfer of data from one element to another being well known in the art.

Figure 18:
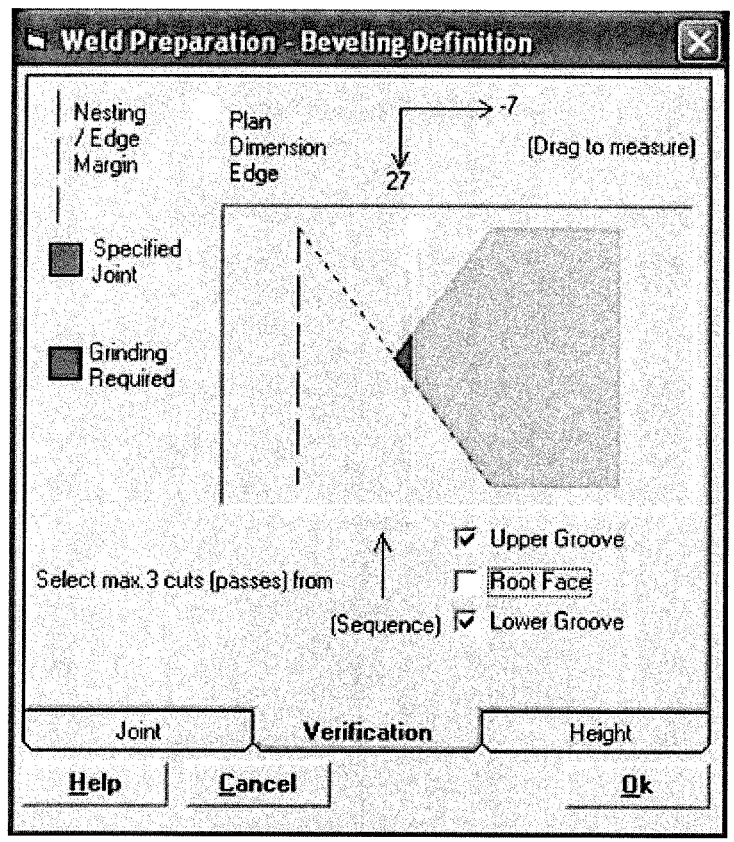
FIG. 18 shows one exemplary screen shot illustrating grinding when the center cut is omitted.

In practice, not all passes of the cutting tool are needed to achieve an optimum result. As such, NC programmer 1316 may be instructed to exclude the middle Root Face pass to reduce expense as the middle pass may remove very little material and is not as reliable as grinding the root face by hand, where critical. This is particularly relevant since 95% of the work is done by two passes of the cutting torch. See for example FIG. 18 that shows one exemplary screen shot illustrating grinding when the center cut is omitted.

Further, many beveled parts may be cut from one plate. The CAM files (e.g., contour data 824, FIG. 8b, and machine contour data 1322) discussed above may be nested onto the plate, and the original CAM drawing may be exploded into one, two, or three passes needed to fabricate the part. Nesting is an established and well known process, but as used herein, the true size of the beveled parts may be calculated and the overlap of parts may be prevented. This may prevent the accidental overlap of parts which look to be separate on the top view of the plate but which can collide on the bottom view, for example.

Figure 15:
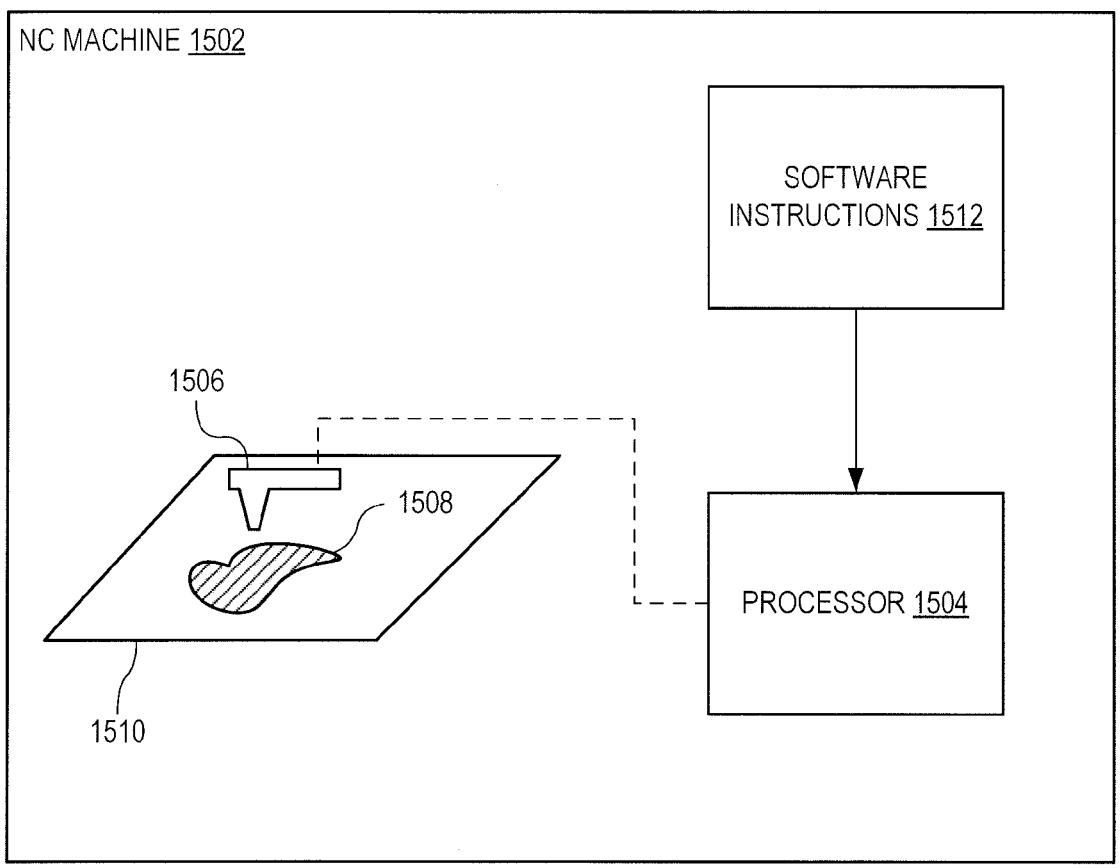
FIG. 15 is a schematic diagram illustrating one exemplary NC machine, with a processor and a cutting torch, for cutting out one or more parts, with bevels, from a sheet of material.

FIG. 15 is a schematic diagram illustrating one exemplary NC machine 1502, with a processor 1504 and a cutting torch 1506, for cutting out one or more parts 1508, with bevels, from a sheet of material 1510 based upon software instructions 1512. Software instructions 1512 may represent contour data 824 of FIG. 8b.

Figure 19:
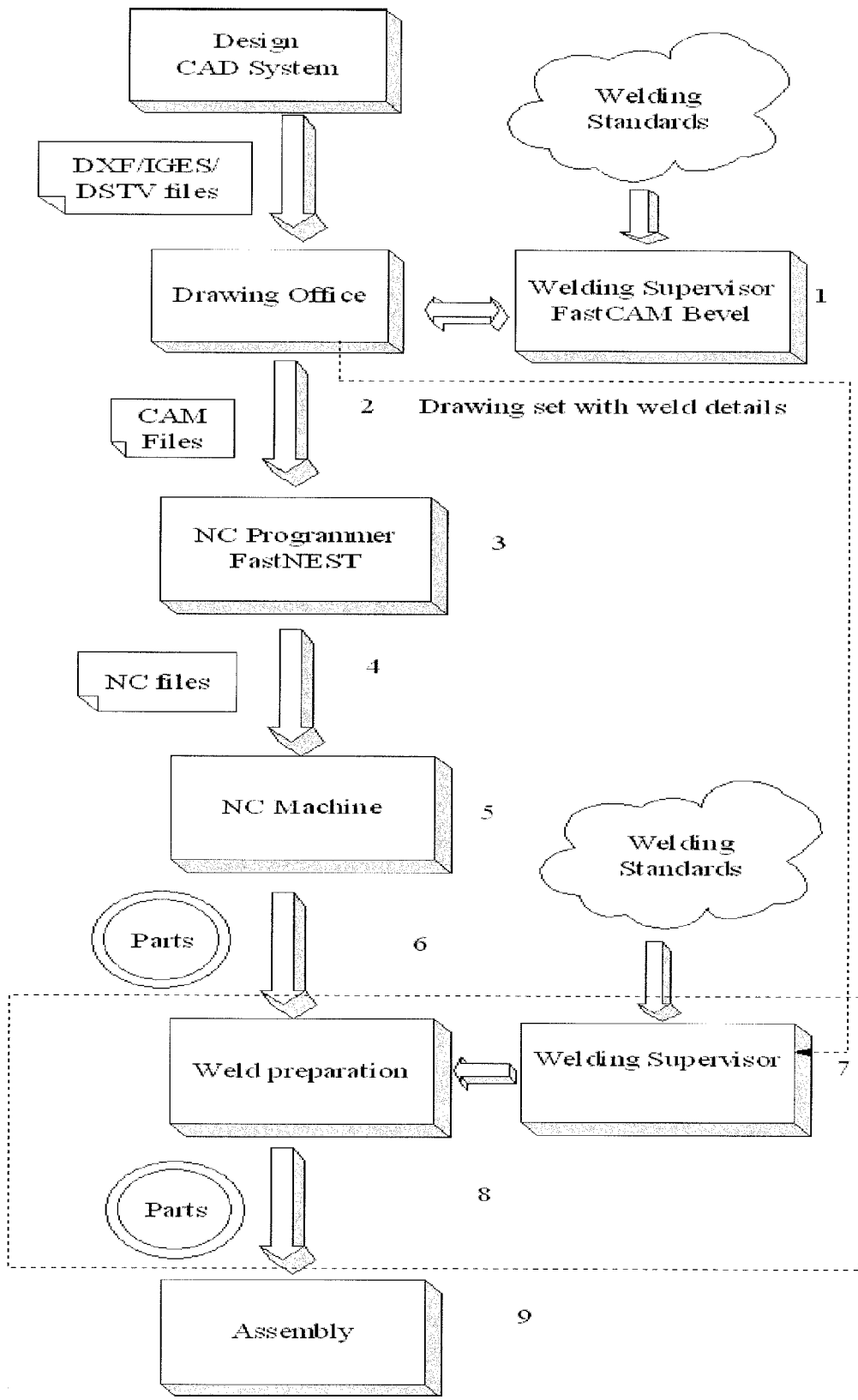
FIG. 19 is an exemplary diagram showing information flow according to the present disclosure, in an embodiment.

It should thus be apparent that the methods, systems and software disclosed herein provide useful enhancements to multi-pass weld preparation, including how to go around corners, changes to NC machines and NC controls and even the manner of cutting using edge starts. They provide solutions to unique problems such as part interference in nesting and even the collection of the data for describing weld profile. To further illustrate and contrast the prior art (FIG. 8a), FIG. 19 illustrates information flow commensurate with the present disclosure, and includes the trademarks FastNEST and FastCAM, owned by the assignee hereof, to more clearly describe this figure. In particular, welding supervisor Fast-CAM Bevel at step 1 corresponds to geometry editor 811, FIG. 8b; and NC Programmer FastNEST corresponds to Nesting and NC Generation software 812, FIG. 8b. Steps 1-9 of FIG. 19 show information flow for various steps of this process as labeled in the figure. For example, geometric weld details are added to the CAM file in step 2, prior to the nesting or NC stage in step 3.

Those skilled in the art appreciate that variations from the specified embodiments disclosed above are contemplated herein and that the described embodiments are not limiting. The description should not be restricted to the above embodiments, but should be measured by the following claims.

The invention claimed is:

1. A method for controlling a numerical control (NC) machine having a single cutting tool to cut out from a sheet a part with weld preparation, comprising the steps of:
   a) combining weld preparation parameters with an electronic description of the part to form an enhanced electronic file, the electronic description of the part including at least an electronic definition of a line segment of the part in an XY plane of the sheet, the step of combining including a substep of embedding the weld preparation parameters with the electronic definition of the line segment of the part in the XY plane of the sheet in the enhanced electronic file;
   b) converting the enhanced electronic file into multiple cutter paths to be provided to the NC machine, the multiple cutter paths being useable to control the NC machine to cut out the part with at least one bevel and a dihedral shape based upon the enhanced electronic file;
   c) providing the NC machine with the multiple cutter paths;
   d) instructing the NC machine, the NC machine having the provided multiple cutter paths, to cut the part from the sheet; and
   e) controlling the NC machine to cut the sheet along the multiple cutter paths by the single cutting tool along the line segment, each of the multiple cutter paths following a separate but parallel contour along the line segment, the step of controlling comprising moving the cutting tool in the XY plane, rotating the cutting tool, and/or tilting the cutting tool,
   wherein the dihedral shape comprises a center cut selectively varying in dihedral angle relative to a planar surface of the part.

2. The method of claim 1, the electronic description comprising a computer aided design (CAD) file of the part.

3. The method of claim 1, the weld preparation parameters comprising root gap, three respective cut angles, and three respective depths.

4. The method of claim 1, the multiple cutter paths defining a center cut of the part which selectively varies in angle relative to a planar surface of the part.

5. The method of claim 1, wherein the weld preparation parameters comprise a dihedral angle.

6. The method of claim 5, wherein the step of converting to multiple cutter paths comprises generating multiple cutter paths usable by an NC machine to cut the part with consistent dihedral shape at the dihedral angle.

7. The method of claim 1, wherein the multiple cutter paths are usable to control an NC machine to cut out the part with two or three bevels.

8. The method of claim 1, further comprising receiving the electronic description of the part from a computer aided design (CAD) system.

9. The method of claim 1, further comprising obtaining interactive input from a user to generate the electronic description of the part.

10. The method of claim 1, the enhanced electronic file being independent of type or manufacturer of NC machine.

11. The method of claim 1, further comprising saving the enhanced electronic file as a separate file for electronic storage and/or transmission.

12. The method of claim 1, the step of combining comprising interacting with a user to define or collect one or more of the root gap, three respective cut angles, and three respective depths.

13. The method of claim 1, the step of converting comprising determining one or more of inside, outside and slit paths.

14. The method of claim 1, wherein converting the enhanced electronic file comprises grouping continuous, same bevel contours for the NC machine.

15. The method of claim 1, further comprising generating up to three paths that are separate parallel paths with kerf offsets.

* * * * *